US007373320B1

(12) United States Patent
McDonough

(10) Patent No.: US 7,373,320 B1
(45) Date of Patent: May 13, 2008

(54) MECHANISM AND BUSINESS METHOD FOR IMPLEMENTING A SERVICE CONTRACT FUTURES EXCHANGE

(76) Inventor: Timothy Francis McDonough, 1433 Stratford La., Denton, TX (US) 76201

( * ) Notice: Subject to any disclaimer, the term of this patent is extended or adjusted under 35 U.S.C. 154(b) by 0 days.

(21) Appl. No.: 09/539,132

(22) Filed: Mar. 30, 2000

(51) Int. Cl.
*G06F 17/60* (2006.01)
(52) U.S. Cl. ............................ 705/35; 705/36; 705/37; 705/38
(58) Field of Classification Search ................. 705/37, 705/35, 36, 38; 235/379, 380
See application file for complete search history.

(56) References Cited

U.S. PATENT DOCUMENTS

| 4,588,192 A | 5/1986 | Laborde |
| 4,903,201 A * | 2/1990 | Wagner ....................... 705/37 |
| 5,262,942 A | 11/1993 | Earle |
| 5,297,031 A | 3/1994 | Gutterman et al. |
| 5,671,364 A | 9/1997 | Turk |
| 5,787,402 A | 7/1998 | Potter et al. |
| 5,797,127 A | 8/1998 | Walker et al. |
| 5,873,071 A | 2/1999 | Ferstenberg et al. |
| 5,905,974 A | 5/1999 | Fraser et al. |
| 5,974,403 A | 10/1999 | Takriti et al. |
| 6,035,289 A | 3/2000 | Chou et al. |
| 6,047,274 A | 4/2000 | Johnson et al. |
| 6,067,532 A | 5/2000 | Gebb |
| 6,236,972 B1 | 5/2001 | Shkedy |

OTHER PUBLICATIONS

Denning et al., "Baltic Freight Futures: Random Walk or Seasonally Predictable?," International Review of Economics and Finance 3(4), (1994) pp. 399-428 ISBN 1059-0560.*

*Electronic Trading on Futures Exchanges*, Current Issues In Economics and Finance, Sarkar and Tozzi, Jan. 1998, vol. 4, No. 1pp. 1-6.
*Getting Hitched*, Futures Industry, (periodical) Mary Ann Burns, Dec./Jan. 1998, (electronic copy, page numbers omitted).
Chang, et al, "The Pricing of Futures Contracts and the Arbitrage Pricing Theory," Journal of Financial Research, v13n4, pp. 297-306 1990.
Polakoff et al, "A Comparison of Foreign Exchange Forward and Futures Prices," Journal of Banking & Finance v15n6, pp. 1057-1080,Dec. 1991.
Kritzman, "What Practitioners Need to Know about Currencies", Financial Analysis Journal v48n2 pp. 27 30 Mar./Apr. 1992.
Scott, "The Information Content of Prices in Derivative Security Markets," International Monetary Fund Staff Papers, v39n3, pp. 596-625, Sep. 1992.
"The Fed, fiscal years and the options on futures", Financial Post, Nov. 16, 1999.
Freeman, "Price Risk and the Agricultural Futures Markets," Food Marketing, v3n3, pp. 18-27, 1987.

(Continued)

*Primary Examiner*—Vincent Millin
*Assistant Examiner*—Daniel Felten
(74) *Attorney, Agent, or Firm*—Rudolph J. Buchel, Jr.

(57) ABSTRACT

The present invention relates a futures exchange for services contracts. The SerFEx is an electronic market system that enables the exchange of cash (spot and forward) contracts and futures contracts for the delivery of services. Services are traded on the exchange similar to commodities on a prior art commodities exchange. The exchange allows the futures market to determine the right price for services for the producers and consumers of those services. Participants may buy, sell, or leverage services contracts through a variety of order types. The exchange is composed of an electronic infrastructure that has four major components: a front-end facility comprised of licensed authorized intermediaries, an automated bid/ask matching system, a clearinghouse system, and a title management system. The exchange operates twenty-four hours per day and seven days per week with all accounts settled at least once in every twenty-four hours. Participants in the exchange may be producers of services, intermediaries, speculators, and consumers of the services.

62 Claims, 13 Drawing Sheets

OTHER PUBLICATIONS

French, "A Comparison of Futures and Forward Prices," Journal of Financial Economics, v12n3, pp. 311-342, Nov. 1983.

Jarrow et al, "Contracts and Futures Contracts, Journal of Financial Economics," v9n4, pp. 373-382, Dec. 1981.

Chalupa, "Foreign Currency Futures: Reducing Foreign Exchange Risk," Economic Perspectives, v6n3, pp. 3-1 1, 1982.

Park et al, "Differences Between Futures and Forward Prices," Journal of Futures Markets, v5nl, pp. 77-88, 1986.

Aggarwal et al, "Corporate Use of Options and Futures in Foreign Exchange Management," Journal of Cash Management, v9n6, pp. 61-66, Nov./Dec. 1989.

Blankey et al, "Accounting for derivatives under SFAS No. 133," Mid-Atlantic Journal of Business, v36n1, pp. 17-35, Mar. 2000.

Dec. 1988, Cash and Futures Price Relationships for Nonstorable Commodities: An Empirical Analysis Using a General Theory.

1994, Multiple Delivery Points, Pricing Dynamics, and Hedging Effectiveness in Futures Markets for Spatial Commodities.

* cited by examiner

200
Network

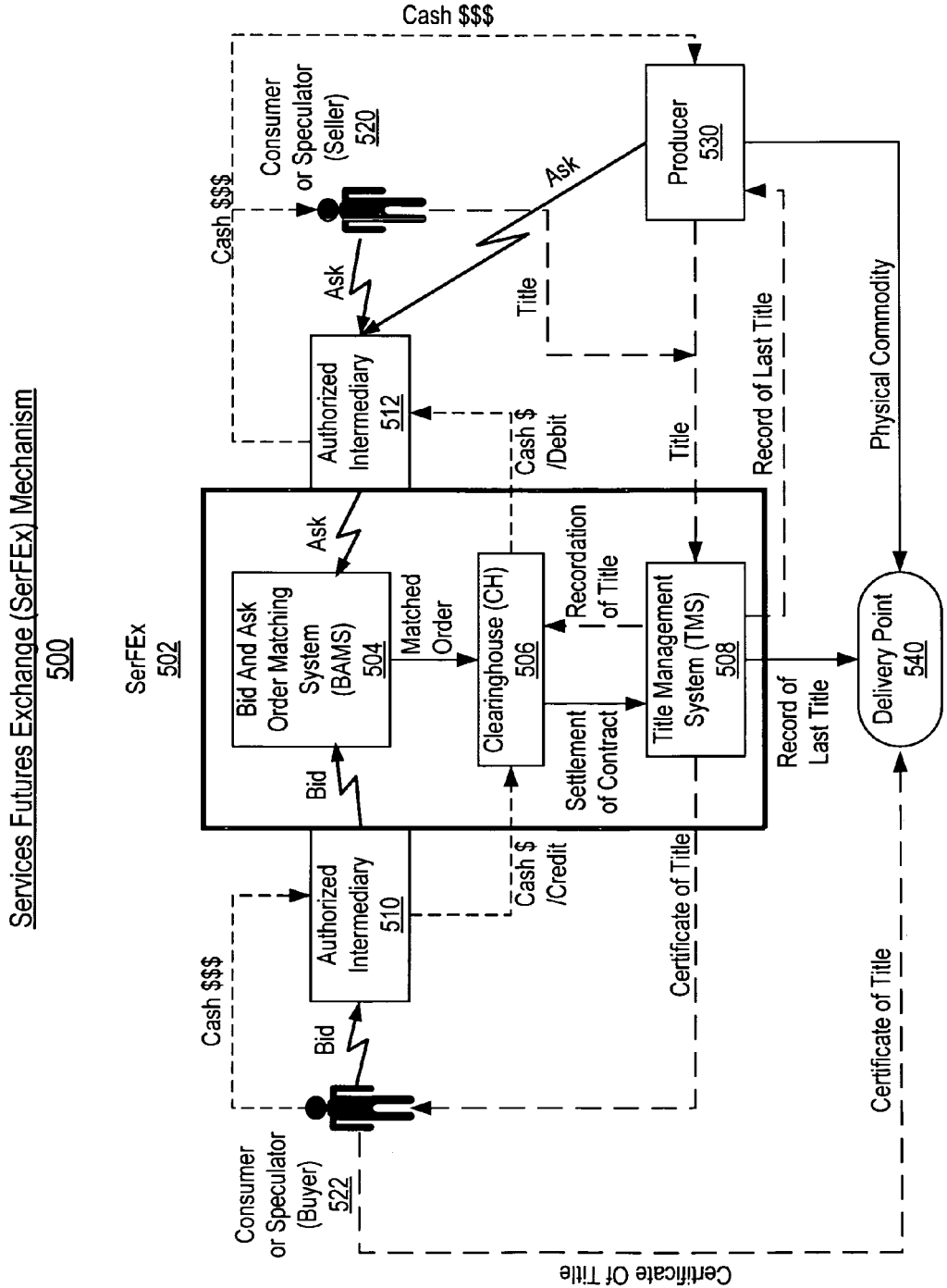

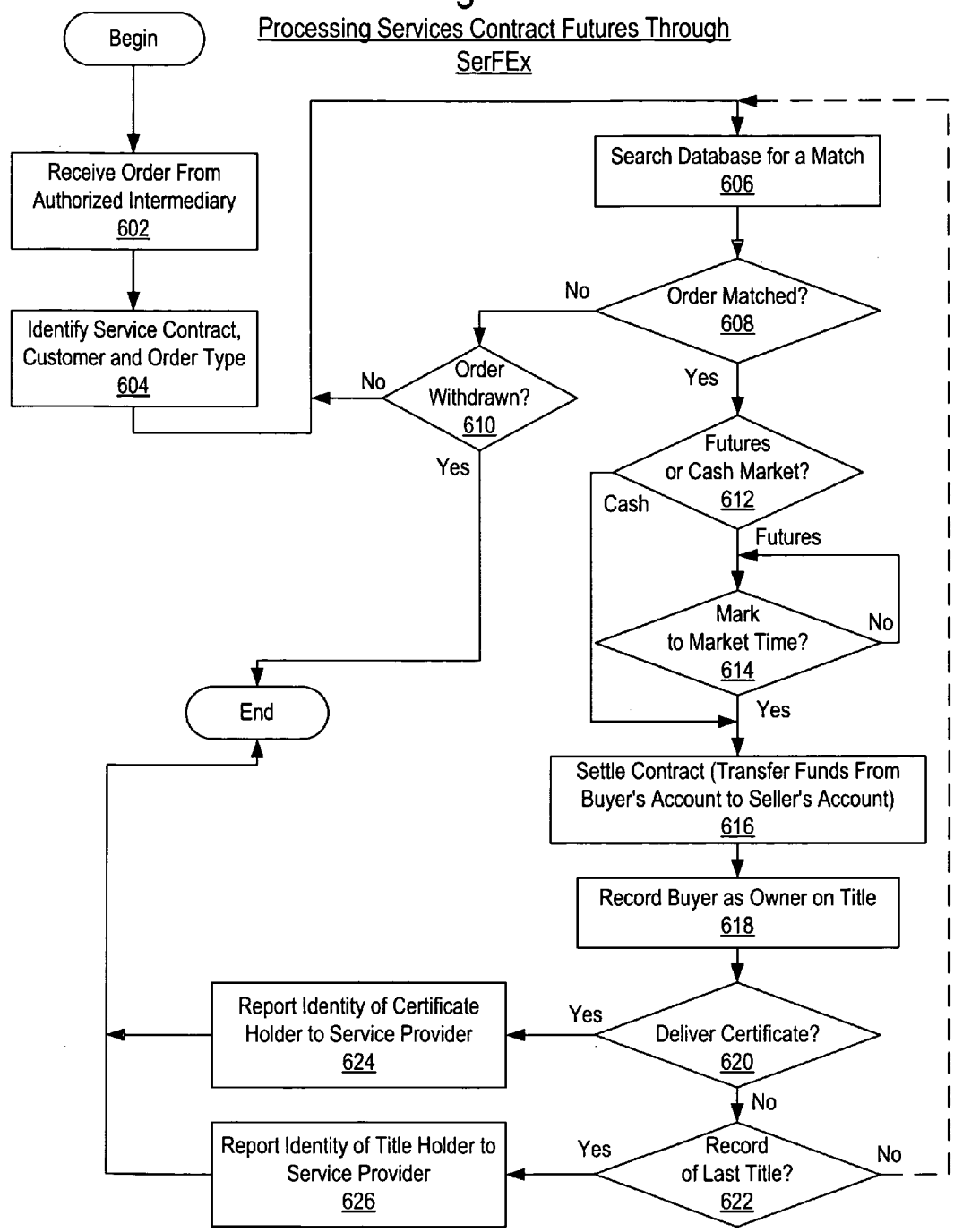

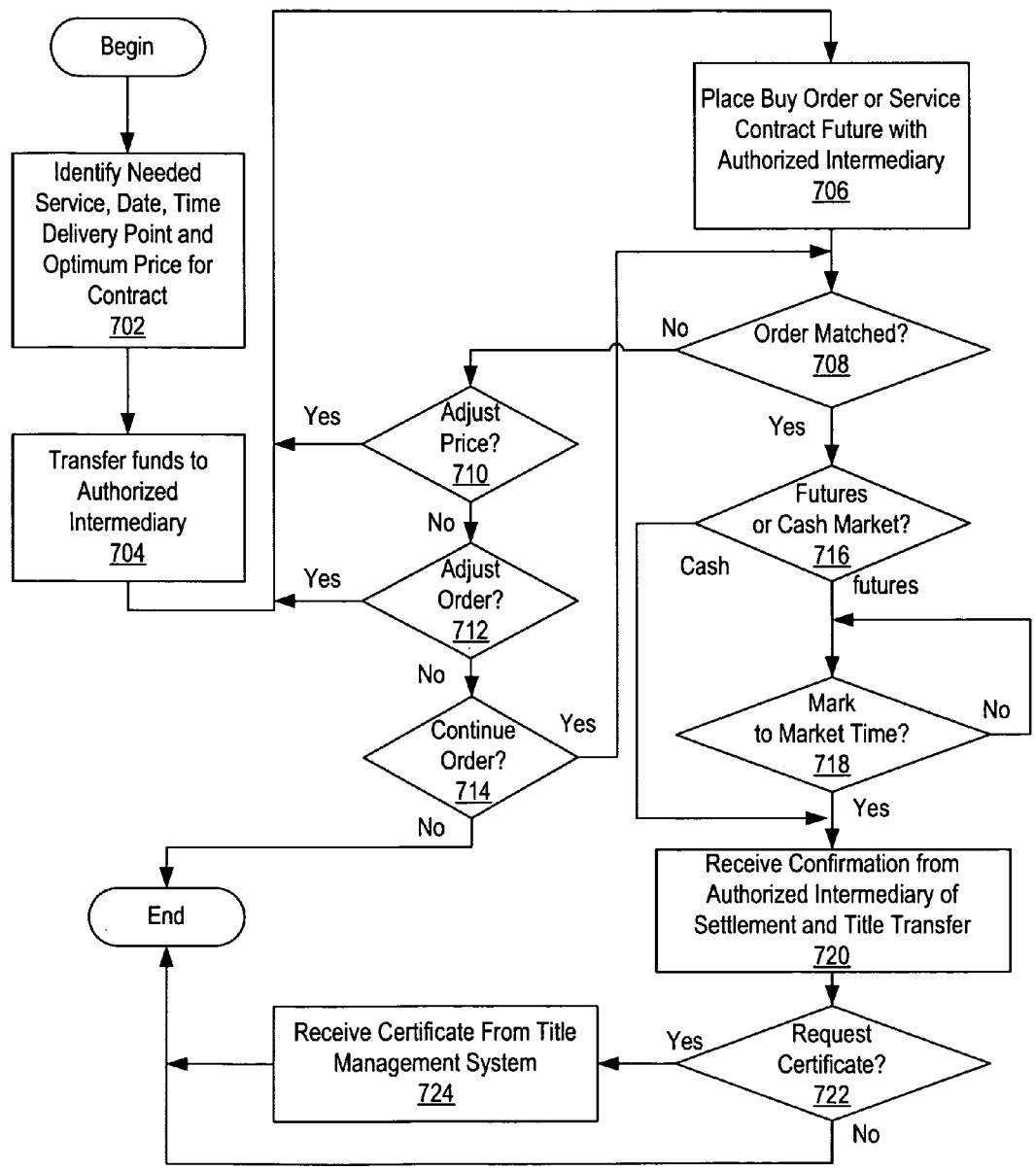

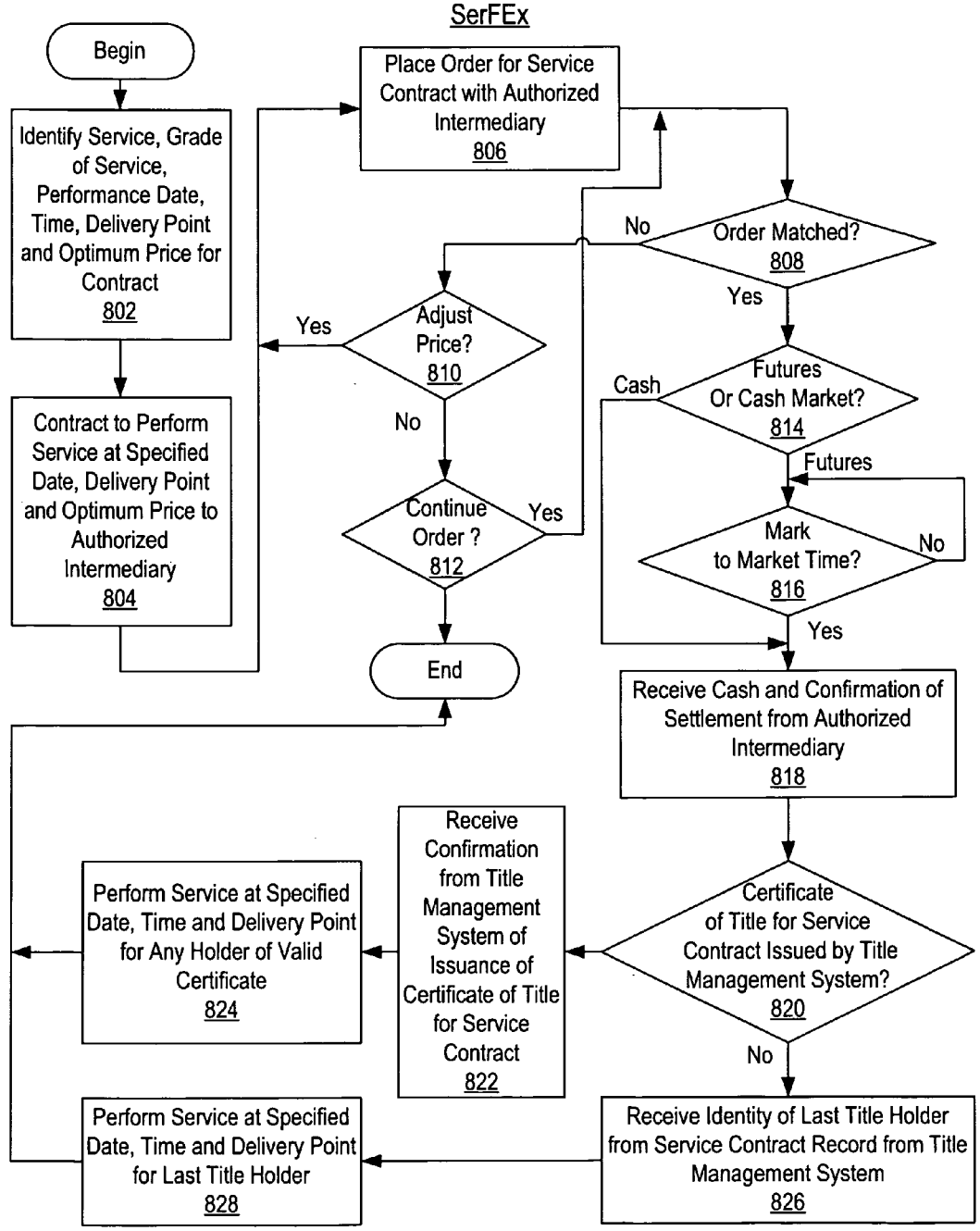

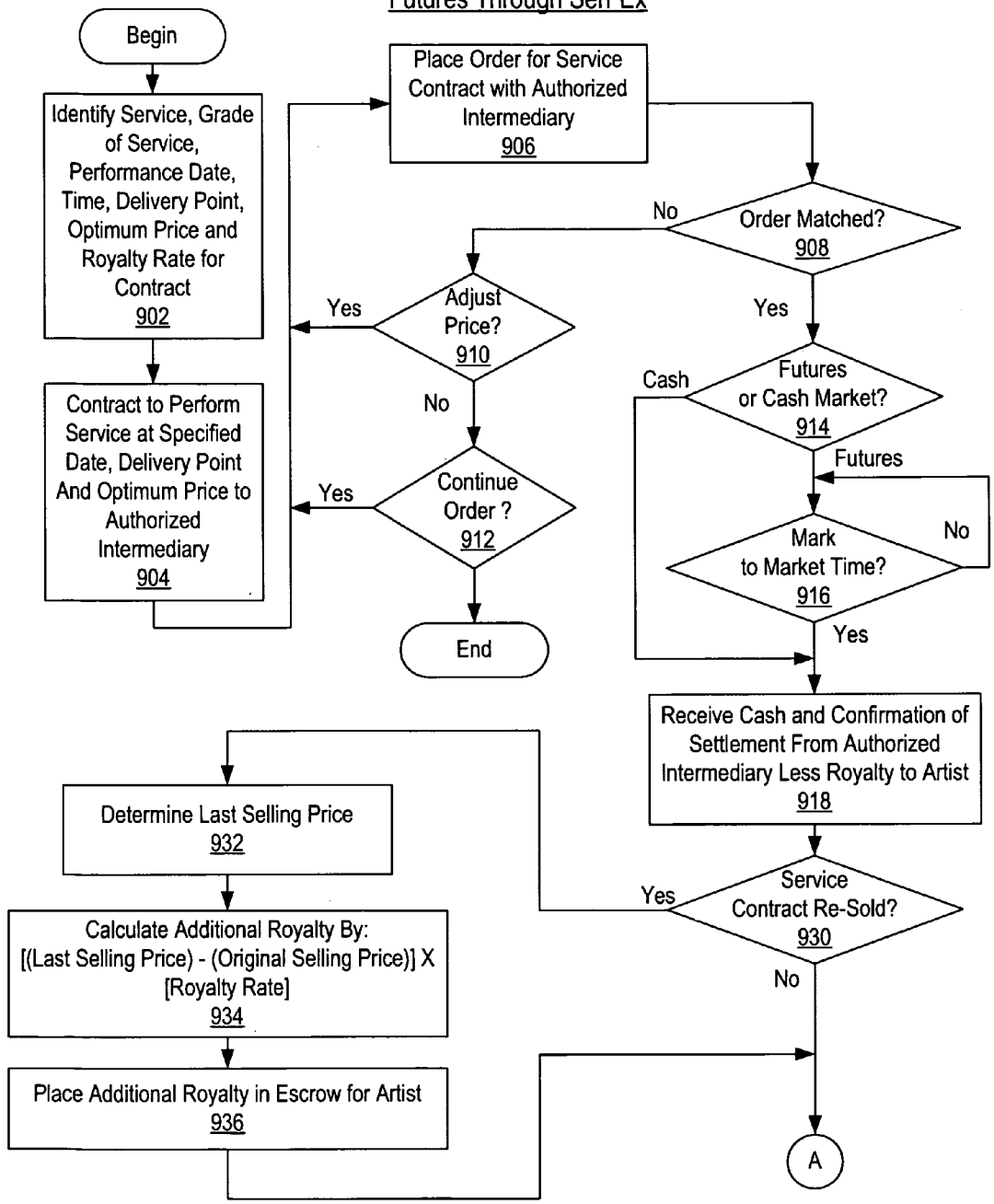

Selling Royalty Escrow Service Contract Futures Through SerFEx

Changing A Service Contract Order In The SerFEx

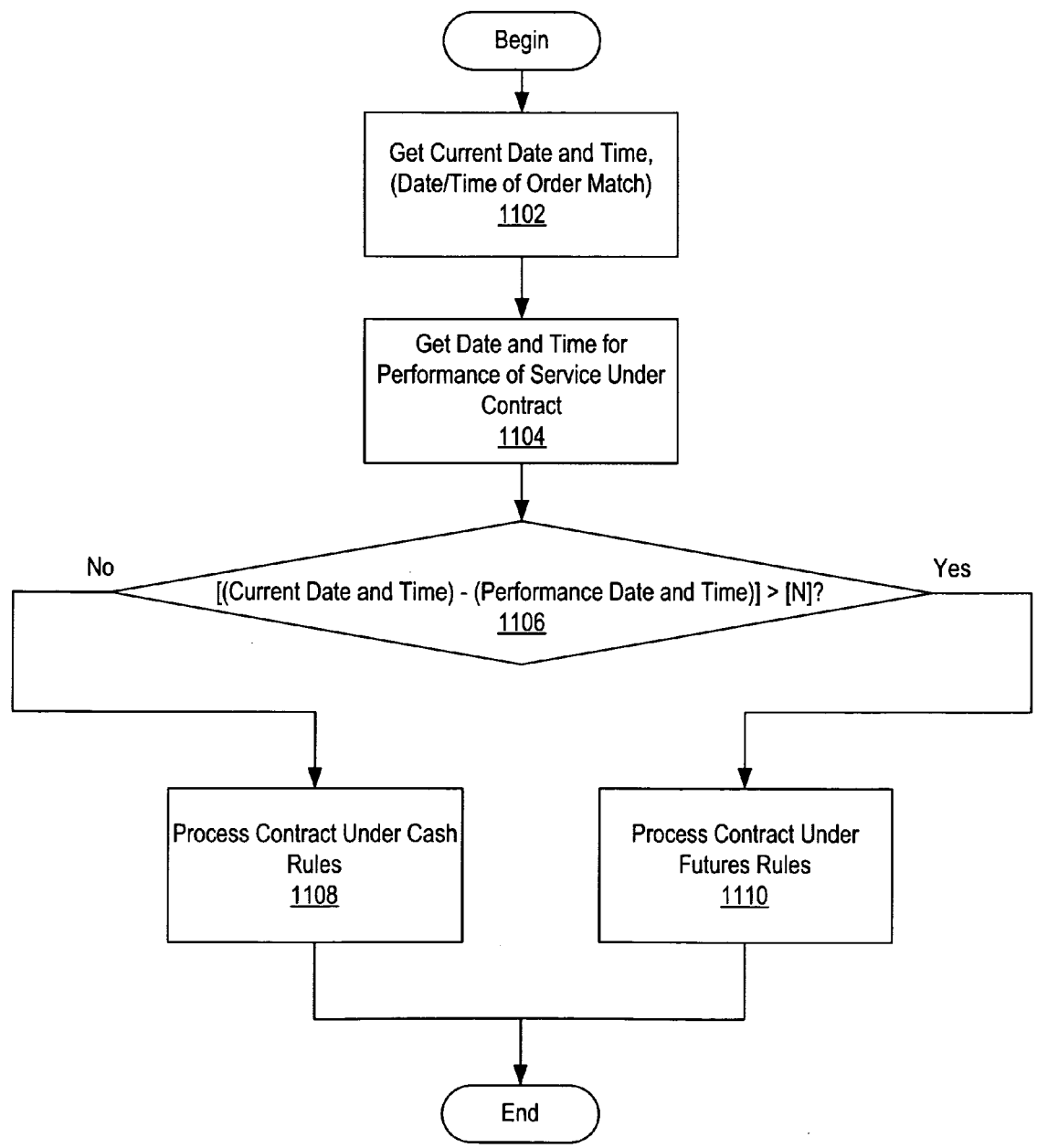

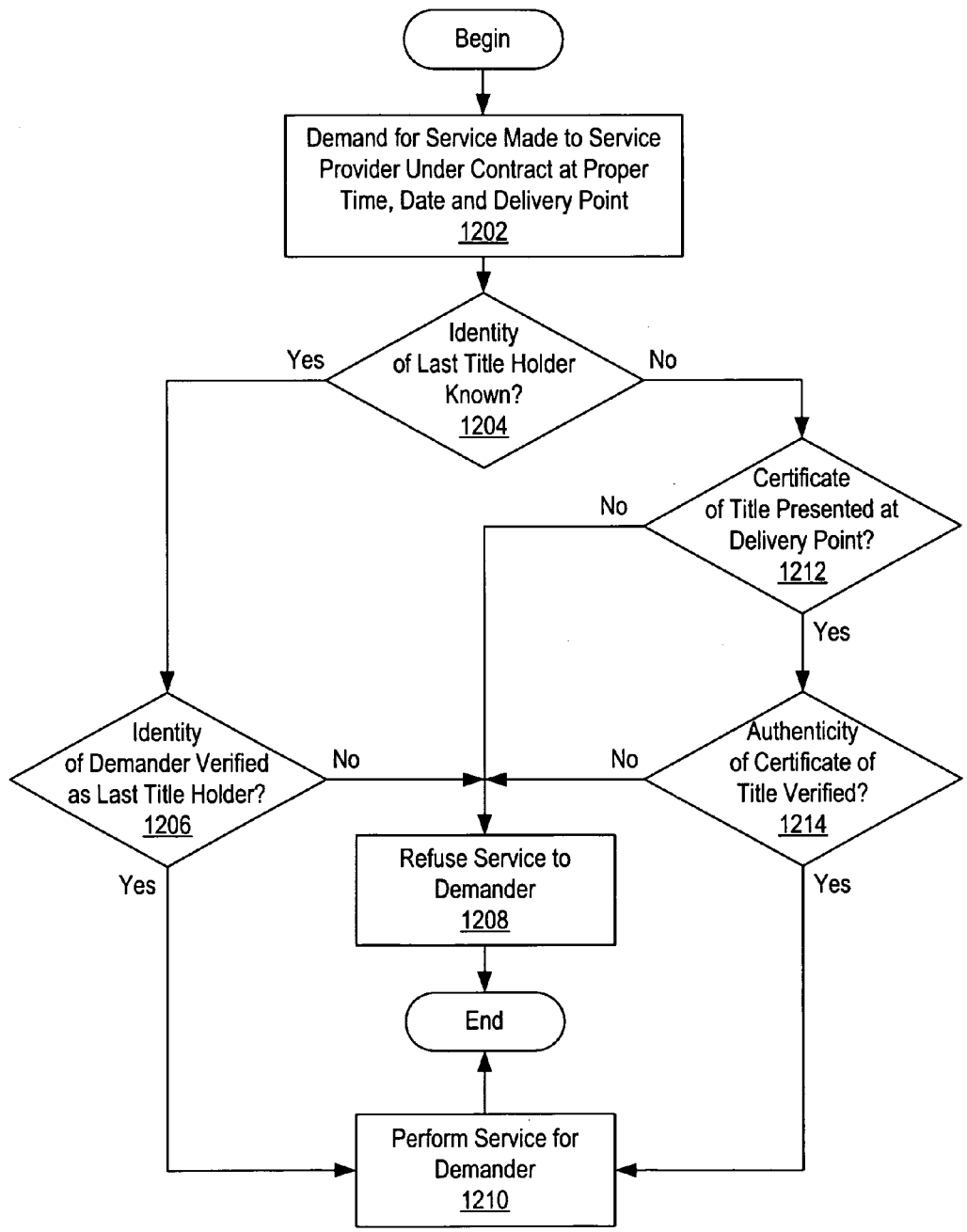

MECHANISM AND BUSINESS METHOD FOR IMPLEMENTING A SERVICE CONTRACT FUTURES EXCHANGE

BACKGROUND OF THE INVENTION

1. Technical Field

The present invention relates to a business method for implementing an exchange of service contracts.

2. Description of Related Art

A futures contract is an agreement to buy or sell in the future a specific quantity of a commodity at a specific price. Most futures contracts contemplate that actual delivery of the commodity can take place to fulfill the contract. However, some futures contracts require cash settlement in lieu of delivery and most contracts are liquidated before the delivery date. An option on a commodity futures contract gives the buyer of the option the right to convert the option into a futures contract. Futures and options must be executed on a commodity exchange—with very limited exceptions—and through persons and firms who are registered with the Commodity Futures Trading Commission (CFTC).

Commodity futures or "futures contracts" are highly regulated and generally traded only on the floor of a commodity exchange such as the Chicago Board of Trade, the Chicago Mercantile Exchange, the New York Mercantile Exchange, the New York Cotton Exchange, the Kansas City Board of Trade and the Minneapolis Grain Exchange. Most of the participants in the futures markets are commercial or institutional users of the commodities they trade. These users, many of whom are "hedgers," want the value of their assets to increase and they also want to limit, if possible, any loss in value. Hedgers may use the commodity markets to take a position, which will reduce the risk of financial loss in their assets due to a change in price. Farmers hedge against future price uncertainties. A cotton farmer, for example, will generally sell futures contracts on a large portion of the cotton crop in order to be guaranteed a minimum selling price prior to harvest. Conversely, a cotton mill owner who wants to sell a customer a quantity of cloth for delivery some months in the future, but does not own enough cotton to produce the cloth, could hedge by buying enough futures contracts to cover the forward sale of cloth.

The cotton mill owner now has a price for raw material to which operating and production costs can be added to arrive at a base price for cloth. Quoting such a price before buying the cotton would make him vulnerable to a price rise, but having bought futures in a quantity equivalent to his needs, he has some assurance that a rise in futures prices would lessen the impact of a rise in the cost of the actual cotton.

Here are three examples of how hedging helps the cash market work better:

1. Hedging stretches the marketing period. A producer does not have to wait until his product is ready to market before selling the product. The futures market permits producers to sell futures contracts to establish the approximate sale price at any time between the time an immature product is established and the time the mature product is ready to market, sometimes four to six months later. The producer can take advantage of good prices even though the product is not mature enough for market.
2. Hedging protects inventory values. A merchandiser with a large, unsold inventory can sell futures contracts that will protect the value of the inventory, even if the price of the commodity drops.
3. Hedging permits forward pricing of products. A manufacturer, for instance, can determine the cost for a product by buying a futures contract on raw products, translate that to a price for a manufactured or finished product, and make forward sales to buyers at firm prices. Having made the forward sales, the manufacturer can use its capital to acquire only as much raw product as may be needed to manufacture the finished products that will fill its orders.

Other participants are "speculators" who hope to profit from changes in the price of the futures or option contract. Commodity production and marketing involves sizable price risks, and risk represents a cost, which affects the value of a commodity. While there is no way to eliminate uncertainty, futures markets provide a competitive way for commodity producers, merchandisers, processors, and others who may own the actual commodity to transfer some price risk to speculators who will willingly assume such risk in hopes of making a profit. Take the example of the cotton farmer mentioned above, there the cotton farmer transfers the price risks to a speculator. However, a cotton farmer who sells most but not all futures contracts for a prospective cotton harvest is both a speculator and a hedger because the farmer speculates on the futures contracts being held while hedging on the futures contracts which are sold.

Futures exchanges perform a vital role in a market economy. Because of their highly competitive nature, futures exchanges provide three important economic benefits:

1. With many potential buyers and sellers competing freely, futures trading is a very efficient means of determining the price level for a commodity. This is commonly referred to as price discovery;
2. Futures markets permit producers, processors, and users of commodities, debt instruments, and currency markets a means of passing the price risks inherent in their businesses to traders who are willing to assume these risks. In other words, commercial users of the markets can hedge, which is, to enter into an equal and opposite transaction in order to reduce the risk of financial loss due to a change in price and, by doing so, lower their costs of doing business. This results in a more efficient marketing system and, ultimately, lower costs for consumers; and
3. Since futures markets are national or worldwide in scope, they act as a focal point for the collection and dissemination of statistics and vital market information.

In the days before credit was readily accessible, some stores carried the sign, "cash and carry," meaning: pay your cash and carry away the merchandise you purchased. That, in its simplest form, is the cash market. The buyer finds the precise commodity that suits him—perhaps an orange that has ripened to the proper degree—pays his money and becomes the owner of the merchandise. Technically, cash market trading usually occurs after a predetermined point in the life of a commodity future, for instance, forty-eight hours prior to the delivery date. At that point the futures contract leaves the futures market and automatically converts to a cash contract.

Sometimes, cash markets can be modified and improved to serve a particular purpose. For example, a person who goes to the newsstand to buy a magazine may find that it is more convenient to contract with the publisher for delivery at home. This modification is called a forward contract, and such contracts are widely used in many types of business. The buyer and the seller agree today on a description of the product that will be delivered in satisfaction of the contract.

The buyer makes payments as agreed, and the seller will deliver the asset at a designated site on a specified date. The problem with this arrangement is that the buyer cannot take adage of price reductions due to supply and demand pressures.

Futures contracts differ from forward contracts in that the owner of a futures contract may sell any part of the contract prior to the contract being executed. An owner of a forward contract must take possession of the physical commodity without transferring any right or portion of the physical commodity prior to execution of the forward contract. Conversely, the owner of a futures contract may sell the contract prior to the date of execution or even sell options on the contract that may act to leverage the futures contract away from the owner in the future.

In a competitive market system, buyers and sellers determine prices for commodities through their transactions in the marketplace. The prices at which sellers offer to sell their goods and buyers bid to buy them are based on their best current assessments of the supply and demand for the commodity.

Usually, no one knows the exact total supply of a commodity. For example, in the United States most commodities are produced by many firms. Storage and ownership are also fragmented. The total supply available is usually an estimate, as is new production, and inventory figures are not precise. In addition, the quality of the commodity frequently is not known. Thus, contributing to the complexity of determining an appropriate price.

Demand is even more difficult to measure, based as it is on what people may decide they wish to buy. Changing prices may alter consumers' intentions regarding the quantity of a close substitute commodity they want—or whether they want it at all. The availability of a substitute may change the demand picture for the original product as well as for the related one. However, prices for goods in the marketplace play a vital role in our economic system and help to efficiently allocate scarce resources.

Price is a rationer; if the price is right, the supply of a commodity should balance the demand for it—production should match use. If the price is too high, some who may have planned to use a product may decide to use less, go without, or they may select a substitute for example, they may eat chicken instead of beef. If enough users are priced out of the market, the price may turn down which may encourage more use and discourage production. If the price is too low, users will deplete existing supply and a shortage may develop. Subsequently, prices may rise, which will tend to discourage marginal buying. Should the price remain relatively high this would likely promote production or attract additional supply of the good.

Price discovery is the process of arriving at a figure at which one person will buy and another will sell a futures contract for a specific expiration date. In an active futures market, the process of price discovery continues from the market's opening until its close. Futures markets, because of low transaction costs and frequent trading, encourage wide participation, lessening the opportunity for control by a few buyers and sellers. Because they are freely and competitively determined, futures prices are generally considered to be superior to administered prices or prices that are determined privately.

Price discovery for a particular commodity usually occurs between a buyer and a seller of a particular commodity on the floor of a futures exchange. The floor area of an exchange is divided into pit areas or pits for trading of a particular commodity, e.g. corn, wheat, and cattle. Buyers and sellers of commodities negotiate a price or discover a price in the pit. The trading process is an extremely fast-paced interaction between licensed brokers who use hand signals to communicate a price and acceptance to one another. Once a bid price and an ask price match the contract price is agreed and price discovery occurs. Futures contracts are usually standardized as to quantity, quality, and location so buyers and sellers in the pit only bargain over price. Because of this standardization, commercial interests are better able to compute local cash prices. This contributes to local market efficiency and to consistency among markets. In many commodities, futures prices have earned a role as key reference prices for those who produce, process, and merchandise the commodity. Since cash and futures prices reflect similar price-affecting factors, their price levels tend to rise or fall together.

Forward prices resulting from forward contracts, on the other hand, are preset at a predetermined price level and many times that price is quite different from the cash price for a commodity. Because the owner of a forward commodity contract cannot participate. in a futures market, the forward contract is exempt from the price discovery process. Therefore, forward prices reflect a certain inefficiency brought about by inaccurate assessments of future supply and demand for a commodity. The difference between the forward price and the cash price is referred to as the price basis or basis. The magnitude of the basis is a measure of the inefficiency inherent in the particular forward market.

Futures trading is not intended as a way to transfer ownership of the actual commodity, so few traders deliver on futures contracts. Cash markets normally provide the most efficient way to exchange ownership of a commodity; futures markets are a way to forward price the commodity and to lessen the risk of ownership. Studies have concluded that the futures markets do not "cause" cash market prices to rise or fall. Both the cash and futures markets respond to the same basic supply and demand factors. Because futures trading has low transaction costs, participants are able to actively and immediately express their views on their estimate of projected likely prices. New information is continuously injected into the market via last sale prices for various futures contracts. This results in expectations about price movements being first noticed in the organized exchange traded futures markets. On the other hand, the cash market tends to respond to situations in its local geographic area while the futures market tends to additionally consider broader national, as well as international implications to events. But the regulatory force of arbitrage—which is the simultaneous purchase and sale of identical goods in two markets at different prices to capture a riskless profit—keeps all markets in rough balance. Either price may move first or furthest.

Forward contracts, on the other hand, represent only a price snap shot in time. Unlike a futures contract, the owner of a forward contract will take delivery of the commodity on a predetermined date. Forward contracts are often negotiated between an institutional seller and a buyer, where the buyer is either the end consumer or a smaller commercial buyer. Once a match occurs between the buyer and seller on a forward contract, that commodity contract is no longer traded in the commodity exchange. Because of the nontransferable nature of forward contracts, their use in commodity markets is somewhat limited. The price discovery process is interrupted.

Forward contracts are, however, the primary mechanism for contracting for future services. Generally, an institutional service seller is the service producer itself and the buyer is the consumer of the service. The basis for most services often are extremely high, that is, the cash price is several times higher than the forward price. The cash price for a sporting or entertainment event will often cost twice the forward price. Normally the patron will order tickets over the telephone or Internet and pay by credit card. The buyer receives a confirmation number or optionally an E-ticket that may be printed from his home computer. At the agreed time and delivery point the buyer presents the confirmation number to the service provider/seller. Usually, the seller controls a box office at the venue and the buyer is admitted.

The same supply and demand pressures that cause commodity prices to fluctuate also affect service prices. The seller attempts to determine an optimum price level for the forward contracts. An optimum pricing strategy might be to adjust the forward contract ask price equal the cost of the service for the seller such that all cash contracts (tickets sold at the door) would represent pure profit to the seller. In that way the seller is hedging with the forward contracts and speculating with the cash contracts. This pricing strategy usually requires that the seller set the forward contract price somewhat lower than the right price for the service in order to guarantee that the event will break even. If the seller raises the forward contract price too high, patrons will seek out alternative entertainment for that date. Alternatively, if the forward contract price is set too low, buyers may gobble up all the forward contracts and the seller may have to rely on the cash contracts for both costs and profit. However, because the forward contracts sold are non-transferable, the seller can be assured that a certain number of the forward contracts will not be redeemed. The seller may either oversell the forward contracts (overbooking), sell additional cash contract for the unredeemed forward contracts, or some combination of both. It is apparent from the forgoing that no price discovery mechanism exists in a service market and the right price for services is never discovered.

It would be advantageous to provide buyers and sellers of a service with a mechanism for discovering the right price for a service.

SUMMARY OF THE INVENTION

The present invention relates to a futures exchange for services contracts. The SerFEx is an electronic market system that enables the exchange of cash (spot and forward) contracts and futures contracts for the delivery of services. Services are traded on the exchange similar to commodities on a prior art commodities exchange. The exchange allows the futures market to determine the right price for services for the producers and consumers of those services. Participants may buy, sell, or leverage services contracts through a variety of order types. The exchange is composed of electronic infrastructure that has four major components: a front-end facility comprised of authorized intermediaries, an automated bid/ask matching system, a clearinghouse system, and a title management system. The exchange operates twenty-four hours per day and seven days per week with all accounts settled at least once in every twenty-four hours. Participants in the exchange may be producers of services, intermediaries, speculators, and consumers of the services.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a pictorial representation of a services commodity futures exchange (SerFEx) mechanism;

FIG. 6 is a flowchart depicting a method for processing service futures contract in accordance with a preferred embodiment of the present invention;

FIG. 7 is a flowchart depicting a method for buying a service futures contract in the SerFEx in accordance with a preferred embodiment of the present invention;

FIG. 8 is a flowchart depicting a method for selling a service futures contract in the SerFEx in accordance with a preferred embodiment of the present invention;

FIGS. 9A and 9B are flowcharts depicting a process for selling royalty escrow services contract futures in the SerFEx in accordance with a preferred embodiment of the present invention;

FIG. 11 is a flowchart depicting a process for determining whether a services contract should be traded in the futures market or the cash market; and FIG. 12 is a flowchart depicting a process for a service provider performing on a service contract in accordance with a preferred embodiment of the present invention.

DETAILED DESCRIPTION OF THE PREFERRED EMBODIMENT

Figure 1:
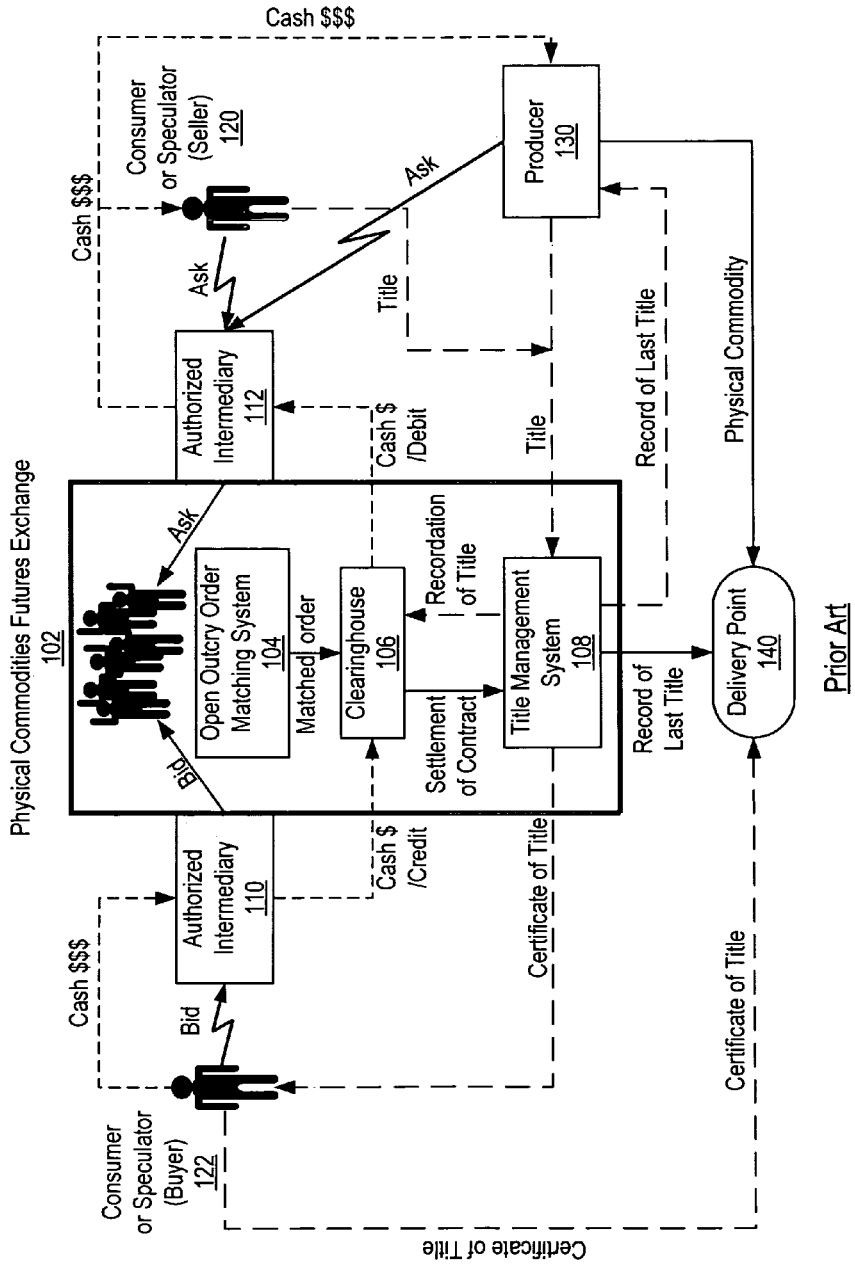
FIG. 1 is a pictorial representation of a prior art physical commodity futures exchange mechanism.

With reference now to the figures, FIG. 1 is a pictorial representation of a prior art physical commodity futures exchange mechanism. For the purposes of this discussion the physical commodity futures exchange mechanism includes all aspects related to the trading of physical commodity futures contracts. Exchange mechanism 100 includes a structure for trading the physical commodity here shown as physical commodity futures exchange 102. Examples of a physical commodity exchange include the Chicago Board of Trade, the Chicago Mercantile Exchange, the New York Mercantile Exchange, the New York Cotton Exchange, and the Kansas City Board of Trade and the Minneapolis Grain Exchange. Physical commodity futures exchange 102 comprises several inter-cooperating systems for bid matching, exchange of funds and recordation of ownership for the physical commodity futures contracts. Normally, order matching within physical commodity futures exchange 102 is a product of an open outcry bidding process associated with open outcry order matching system 104. Once an order is matched, clearinghouse 106 oversees the financial transaction prior to title management system 108 recording transaction.

Producer 130 originates a physical commodity futures contract by establishing the precise grade, quantity, delivery date, delivery point, and asking price for the commodity with the authorized intermediary 112. Both buyer intermediary 110 and seller intermediary 112 are registered with the Commodity Futures Trading Commission (CFTC)) and maintain a physical presence within open outcry order matching system 104. Producer 130 also escrows title for the futures contract with title management system 108. It is assumed that more sellers' commodity futures contracts are presented for sale within open outcry order matching system 104, such as seller 120. Conceivable however, only single producer's and/or seller's futures contracts may be for sale.

Buyer 122 participates in the exchange by establishing an account with authorized intermediary 110 and arranging to cover the cost of buying any futures contracts being bid on. Normally, buyer 122, seller 120 and producer 31 telecommunicate their respective bid and ask prices to respective authorized intermediaries 110, and 112. Using open outcry order matching system 104, authorized intermediary 112, asks a price for commodity futures contracts owned by either seller 120 or producer 130. In return, authorized intermediary 110 bids on commodity futures contracts based on bidding instructions from buyer 122. Authorized intermediary 110 and authorized intermediary 112 must maintain a physical presence in open outcry order matching system 104 within physical commodities futures exchange 102 in order to participate in the open outcry bidding in the pit. Using the prior art order matching system, bids are manually matched on the floor of the exchange and sent on to clearinghouse 106.

Every twenty-four hours, at a predetermined time, clearinghouse 106 reconciles the day's trading. The function of clearinghouse 106 is to balance the books between the authorized intermediaries and transfer the necessary funds to cover the previous day's trading. In a perfect system, clearinghouse 106 transfers enough cash (actually clearinghouse 106 debits the account of authorized intermediary 110) to cover the physical commodities futures contracts bought by the clients of authorized intermediary 110. Authorized intermediary 112 receives the physical commodities futures contracts being sold by the clients of authorized intermediary 110. However, the rules governing trading within physical commodities futures exchange 102 do not necessarily require seller 120 have title for the physical commodities futures contracts being sold. Seller 120 might sell certain physical commodities futures contracts prior to buying a sufficient number of contracts to cover the sale. In such a scenario, seller 120 must obtain the necessary number of contracts prior to clearinghouse 106 reconciling the day's trading. If not, seller 120 must settle the account by transferring the cash price of the physical commodities futures contracts, which were sold. Seller 120 must make every effort to secure the necessary number of contracts to cover the sale because the price extracted from seller 120 might be much higher than the selling price.

Once the physical commodities futures contract has been settled, i.e. the funds have been reconciled, clearinghouse 106 indicates to title management system 108 that a settlement of contract has occurred and it is necessary to change ownership records on the physical commodities futures contract to reflect the settlement. Title management system 108 originally receives title for the physical commodities under contract from producer 130. After the title has been secured, title management system 108 tracks its rightful owners by updating the ownership records each day the title is traded in the futures market. After recordation is completed, title management system 108 transfers the name of the new owner to clearinghouse 106 in anticipation of the next day's trading. While it is possible for buyer 122 to take possession of a certificate of title from title management system 108 during futures trading, generally the title record remains only in electronic form until delivery.

The cash market differs from the futures market in that a physical commodities futures contract bought in the cash market is immediately reconciled by clearinghouse 106. Subsequent title recordation by title management system 108 is performed automatically upon receipt of contract settlement indication by clearinghouse 106 and recordation of title is immediately transmitted back to clearinghouse 106 thereafter. A record of the last titleholder is transferred to delivery point 140 and/or producer 130, which delivers the physical commodity to delivery point 140. Alternatively, producer 130 might deliver the physical commodity to an escrow agent at delivery point 140 without knowing the identity of the last owner of the physical commodity. The final owner merely presents a certificate of title to the escrow agent who verifies the certificate and releases the physical commodity to the bearer of the certificate. In this scenario the identity of the bearer may never be ascertained because the certificate itself may be a transferable instrument requiring the escrow agent or producer 130 to satisfy the contract upon demand with the certificate.

One problem with the prior art physical commodities futures exchange 102 is that the exchange does not accommodate services, only physical commodities. Heretofore, trading of services futures contracts is unknown. The owner of a service must sell the contract as a forward contract or a cash contract. Because trading of services futures contracts was unknown, the right price for a service could never be discovered. Trading rules concerning prospective service were further constrained by the prior art service allocation mechanisms because the service providers themselves usually operated the allocation mechanism. Market forces were not allowed to dictate the right price for a service because buyers and sellers could not interact in a services futures exchange.

Excluding services from futures exchange mechanisms has deleterious effects on both the service and the exchange mechanism. Physical commodities exchanges have mandated that all commodities are graded such that the value of futures contracts might be more accurately valued. Many times governments assume this role but specialized commodity services have filled gaps where government agencies are absent. Fruit and vegetable growers associations for instance, set quality standards and regulate the application of those standards to the products. Generally, services have no real grading standard, although certain heavily frequented consumer industries do have the beginnings of such grading systems. Hotels and restaurants are often rated from one to five stars based on service quality.

Also, the exchange mechanism itself has not evolved past what is necessary for trading a limited number of types of commodity futures contract. While the electronic transfer of contract parameters between clients and authorized intermediaries is the norm, physical commodity exchanges have been slow to follow. Generally, prior art physical commodities futures exchange utilize an open outcry order matching system for matching bid and ask prices. Even today this is possible because the number of permutations for commodity type, delivery date, grade, and delivery point is very manageable in an open outcry pit. Many commodities are graded based on historically adopted standards, and delivery points and ties are dictated by growing regions and seasons. Many services, on the other hand, are quite ubiquitous. Hotel room futures contracts, for instance, might be delivered (or more properly performed) at virtually any city and on any day. Other services, such as scheduled airline flights between fixed locations might have more limited delivery points, but performance occurs more frequently than daily. Still others, such as a trucking company, may have fixed delivery points and dates but may be more flexible as to the type of contract. There, a carrier may offer a blanket or open contract between certain dates from one of its terminals. The contract type might be not specified by either the buyer or the service provider of the future until the contract enters the cash market. Then, the ultimate consumer of the service buys the service contract and specifies the type. Finally, a services exchange allows a buyer to initiate a services futures contract order in the expectation that a service provider will register title with the services exchange for a similar service. This situation is more like the prior art reverse commodities auction where bidders initiate the process with a bid and physical commodities producers fill the bid, however, in this case, rather than a commodity or a forward contract, bidding would take place for a services futures contract.

In an effort to remedy the shortcoming of the prior art, a services futures exchange (SerFEx) is disclosed in accordance with a preferred embodiment of the present invention. Many aspects of the SerFEx would operate similarly to that of prior art physical commodities exchanges. However, the SerFEx is devoted entirely to the exchange of service contracts between traders and not physical commodities. The Bureau of Labor Statistics considers a service to be a bundle of goods and labor activities provided to a customer to accomplish a given function and the service must be consumed at the time it is provided. Both the provider of the service and the consumer of the service must agree on the basic goal of the activity. A partial list of possible services traded on the SerFEx are: construction; transportation and warehousing; postal services; information; real estate and rental and leasing; financial and insurance; scientific, and technical services; management of companies and enterprises; administrative and support and waste management and remediation services; educational services; health care and social assistance; arts, entertainment, and recreation; accommodation and food services; public administration; and other services.

In accordance with a preferred embodiment of the present invention, a mechanism for trading in derivatives of the services futures and cash contracts would also be traded on the exchange. Such derivatives would include, put and call options on the contracts traded on the exchange and index options that would be associated with the services contract products.

The SerFEx differs from the prior art physical commodities exchanges that trade during preset trading hours. A preferred embodiment of the present invention provides electronic services futures, options and cash contract transactions on a twenty-four hour per day, seven days per week basis. The necessary reliability has been previously achieved by all global electronic financial systems that offer twenty-four hour per day and seven day a week operation with a degree of fault tolerance that is appropriate to maintain a fail-passive or, at minimum, a fail-safe operation. Threats to the desired reliability include physical infrastructure destruction, site-power loss, communications (network) infrastructure failure, hardware failure, software failure, physical security breach, and cyber-attack, each of which have been sufficiently addressed by those of ordinary skill in the art with respect to the prior art systems.

By way of illustration, physical security measures as well as dual facility designs could handle physical threats. In a dual facility embodiment, a second facility that is running synchronously in a master-slave type of arrangement, would be located far enough away from the other to mitigate even force majeure threats such as natural disasters. The master-slave(s) embodiment may include as many redundancy features as the exchange governing board shall deem necessary. Thus, it may be necessary to construct several physical sites in as many different countries. The design of the master-slave relationships will also provide that these relationships may be reversed as the need arises.

Hardware failures could be handled with standard high reliability system design practices such as are found in public safety critical systems like air traffic control systems. Software reliability could also be achieved with standard practices extant in those same public safety systems such as multi-channel operational modes with independently constructed and compiled source code that performs identical functions. Software comparator functions would continuously monitor system output and performance and provide fail-passive or fail-safe market operation.

Network and data security would be achieved by implementing the highest standards established by the U.S. Department of Commerce agency, the National Institute of Standards and Technology (N.I.S.T.) for critical computer system security. Such standards can be found in the so-called "Rainbow Books", originally published by the U.S. National Security Agency, but now managed by N.I.S.T.

In accordance with a preferred embodiment of the present invention, hardware and software would be implemented with large-scale client/server architectures similar to those depicted in FIGS. 2-4 below. The network topology would ideally be an open standard design, thus enabling the use of non-proprietary communications mechanisms like the Internet, including wireless OSI layer-1 technologies. The database technology would be that which is most appropriate for high-volume transaction traffic. The front-end client hardware and software would be everything from interactive text pagers and PDAs to high-end dedicated workstation designs. Network connections could be simple messaging primitives carried over the public infrastructure, dedicated leased broadband facilities, on-site terminal connections, or anything between the extremes of these examples.

Figure 2:
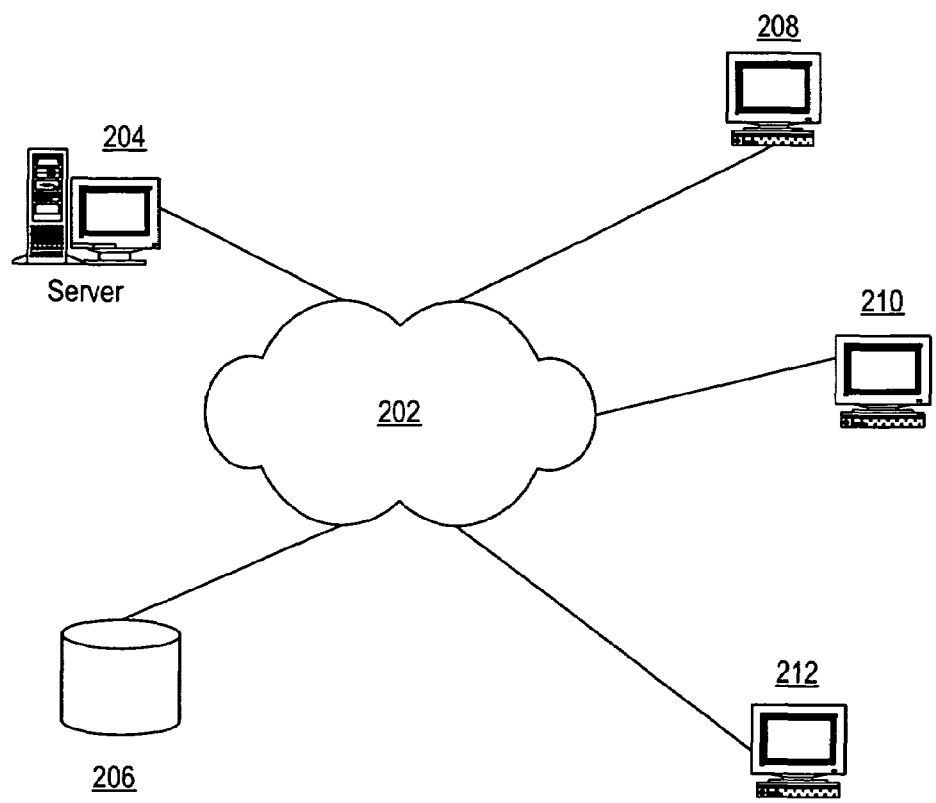
FIG. 2 is a diagram of a distributed data processing system in which the present invention may be implemented.

FIG. 2 is a diagram of a distributed data processing system in which the present invention may be implemented. Distributed data processing system 200 is a network of computers in which the present invention may be implemented. Distributed data processing system 200 contains a network 202, which is the medium used to provide communications links between various devices and computers connected together within distributed data processing system 200. Network 202 may include permanent connections, such as wire or fiber optic cables, or temporary connections made through telephone connections.

In the depicted example, a server 204 is connected to network 202 along with storage unit 206. In addition, clients 208, 210 and 212 also are connected to network 202. These clients 208, 210 and 212 may be, for example, personal computers or network computers. For purposes of this application, a network computer is any computer coupled to a network, which receives a program or other application from another computer coupled to the network. In the depicted example, server 204 provides data, such as boot files, operating system images, and applications to clients 208, 210 and 212. Clients 208, 210 and 212 are clients to server 204. Distributed data processing system 200 may include additional servers, clients, and other devices not shown.

In the depicted example, distributed data processing system 200 is the Internet, with network 202 representing a worldwide collection of networks and gateways that use the TCP/IP suite of protocols to communicate with one another.

At the heart of the Internet is a backbone of high-speed data communication lines between major nodes or host computers, consisting of thousands of commercial, government, education, and other computer systems that route data and messages. Of course, distributed data processing system 200 also may be implemented as a number of different types of networks, such as, for example, an intranet, a local area network (LAN), or a wide area network (WAN). FIG. 2 is intended as an example and not as an architectural limitation for the present invention.

Figure 3:
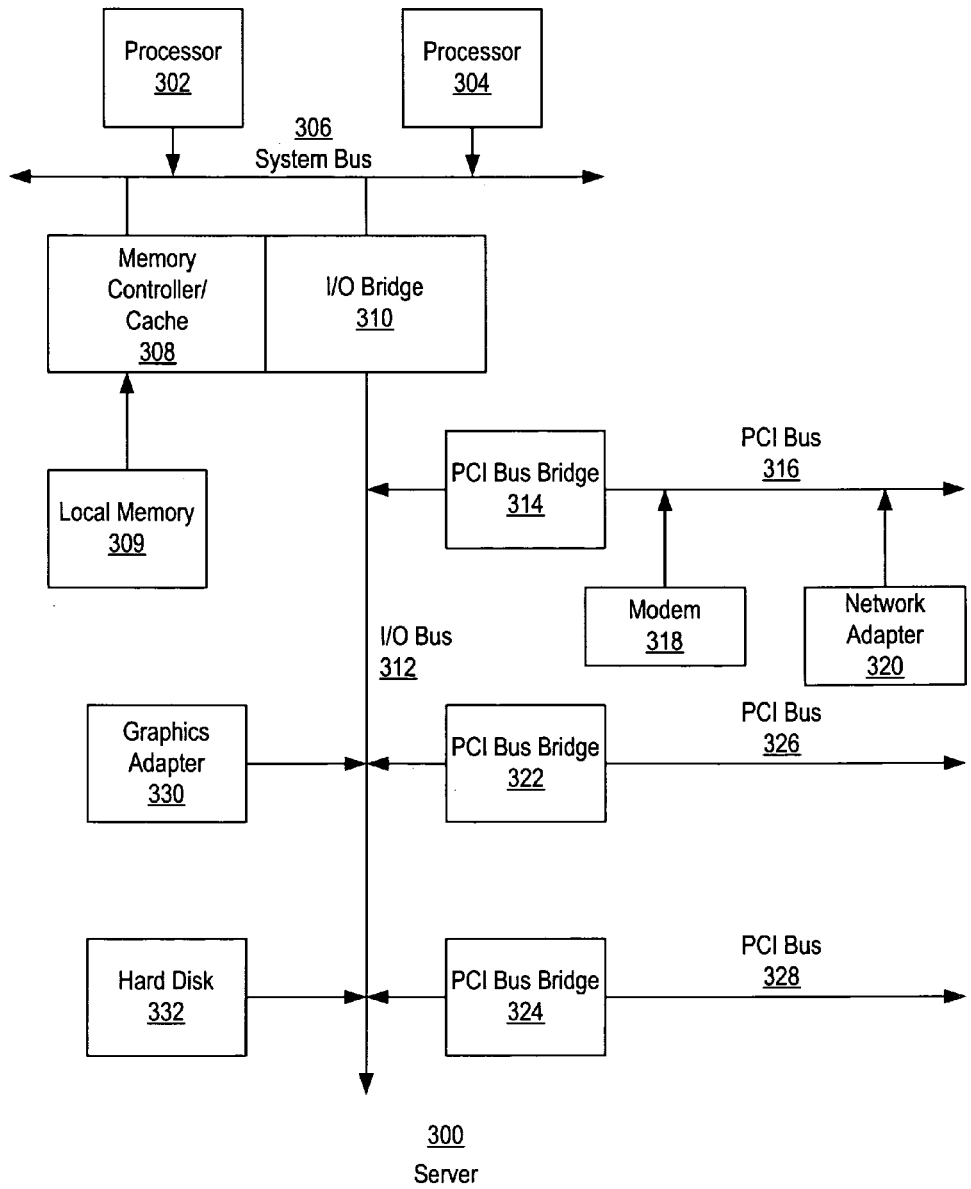
FIG. 3 is a block diagram depicting a data processing system, which may be implemented as a server.

Referring to FIG. 3, a block diagram depicting a data processing system, which may be implemented as a server, such as server 204 in FIG. 2, in accordance with a preferred embodiment of the present invention. Data processing system 300 may be a symmetric multiprocessor (SMP) system including a plurality of processors 302 and 304 connected to system bus 306. Alternatively, a single processor system may be employed.

Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI bus 316. A number of modems may be connected to PCI bus 316. Typical PCI bus implementations support four PCI expansion slots or add-in connectors. Communications links to network computers 208, 210 and 212 in FIG. 2 may be provided through modem 318 and network adapter 320 connected to PCI local bus 316 through add-in boards. Additional PCI bus bridges 322 and 324 provide interfaces for additional PCI buses 326 and 328, from which additional modems or network adapters may be supported. A memory-mapped graphics adapter 330 and hard disk 332 may also be connected to I/O bus 312 as depicted either directly or indirectly.

Those of ordinary skill in the art will appreciate that the hardware depicted in FIG. 3 may vary. For example, other peripheral devices, such as optical disk drives and the like also may be used in addition to or in place of the hardware depicted. The depicted example is not meant to imply architectural limitations with respect to the present invention. The data processing system depicted in FIG. 3 may be, for example, an IBM RISC/System 6000 system, a product of International Business Machines Corporation in Armonk, N.Y., running the Advanced Interactive Executive (AIX) operating system.

Figure 4:
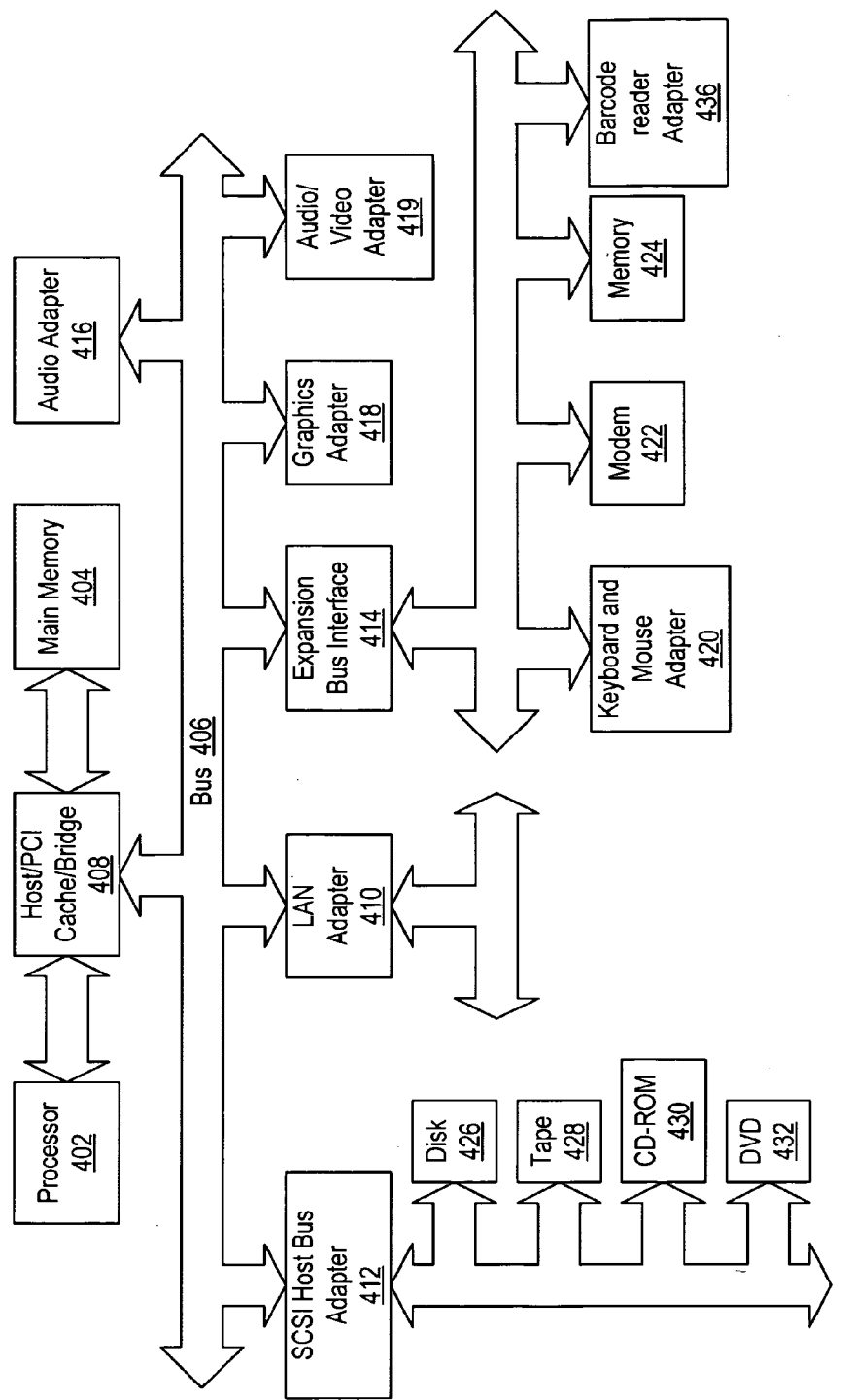
FIG. 4 is a block diagram illustrates a data processing system in which the present invention may be implemented.

With reference now to FIG. 4, a block diagram illustrating a data processing system in which the present invention may be implemented. Data processing system 400 is an example of a client computer. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations support three or four PCI expansion slots or add-in connectors.

An operating system runs on processor 402 and is used to coordinate and provide control of various components within data processing system 400 in FIG. 4. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430, as noted by dotted line 432 in FIG. 4, denoting optional inclusion. In that case, the computer, to be properly called a client computer, must include some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device which is configured with ROM and/or flash ROM in order to provide nonvolatile memory for storing operating system files and/or user-generated data.

Neither the depicted example in FIG. 4 nor the above-described examples are meant to imply architectural limitations.

By incorporating a wide range of exchange interaction mechanisms into a preferred embodiment of the present invention, maximum possible automated intermediation is facilitated, thus permitting direct participation in the marketplace for quantities of suppliers, speculators, and consumers heretofore unknown in the prior art physical commodities futures exchanges. While the intermediation services of exchange members are deemed necessary for the security and integrity of the exchange, human intermediation is reduced to an absolute minimum. Thus, the SerFEx will include only minimum facility for human intermediation mechanisms such as physical open outcry auction or manual settlement procedures. Whenever possible, intermediation functions will be implemented via algorithmically driven automated systems.

Two of the unique challenges associated with offering a futures market facility for services, is that storage is impossible, and that many services are supplied and demanded in conjunctive arrangements. The absolute perishability of services requires the extraordinary reliability of the exchange that is described above. The conjunctive situation arises in applications where two or more service contracts might have a sequential or complimentary relationship.

One example of a conjunctive relationship between contracts would be where a consumer would desire to hold transportation contracts for movement of goods from point A to point C on a certain date and time. There may not be any contracts on the market for A to C but there may be two contracts on the market that together may satisfy the demand. One would be for A to B and the other would be for B to C. It is expected that the front-end software of the client would have the ability to search for contracts that satisfy the constraints of the consumer's demand and that it would also be capable of optimizing the selection of conjunctive contracts within those constraints. This unique conjunctive property of service contracts introduces the opportunity for a new kind of intramarket "spread" speculation, thus perhaps making the operation of the SerFEx particularly attractive to innovative speculators who otherwise could not engage in such a trading strategy on existing commodities futures exchanges.

FIG. 5 is a pictorial representation of a services commodity futures exchange (SerFEx) mechanism. For the purposes of this discussion the services commodity futures exchange mechanism includes all aspects related to the trading of services commodities futures contracts. Exchange mechanism 500 includes a structure for trading a service here shown as services futures exchange 502 (SerFEx).

Similar to a physical commodity contract, service provider 530 may originate a service futures contract by establishing the precise grade, quantity, delivery date, delivery point, and asking price for the service with the authorized intermediary 512. Service provider 530 also escrows title for the futures contract with title management system 508. It is assumed that other sellers' service futures contracts are presented for sale simultaneously within bid/order matching system (BAMS) 504, such as seller 520.

In accordance with a preferred embodiment of the present invention a broker/dealer authorized intermediary, such as authorized intermediary 510 or authorized intermediary 512 may be any authorized intermediary designated by a buyer or seller respectively and licensed by the SerFEx. Authorized intermediaries of different variants fall within the scope of the present invention. For example, an authorized intermediary may be a 'commodity pool broker' that normally conducts institutional transactions for large traders such as insurance corporations and pensions funds. A second type of authorized intermediary is an 'introductory broker' that receives a fee for introducing a buyer and seller. It is expected that an introductory broker would not participate in the negotiation process for buying and selling to the extent of a typical authorized intermediary as the introductory broker merely 'introduces' buyers and sellers having parallel, although not quite matching, order requirements. Another type of authorized intermediary is a floor broker, which is licensed by the SerFEx but generally trades for himself. Other types of authorized intermediaries will become apparent to those of ordinary skill in the art during the discussion of the invention.

BAMS 504 is identical for both the futures and the cash market mechanisms. A preferred embodiment is an implementation of a price/time priority algorithm. All participants in the auction will have full access to all bid and ask order information except the identity of the party submitting the bids. Matched orders on the futures exchange will be passed to clearinghouse (CH) 506 for mark to market settlement at the appointed time each day. BAMS 504 also includes mechanisms for handling a wide variety of order types such as market order, limit orders, contingent, contingency, stop, market-if-touched (MIT), alternative and scale orders.

Buyer 522 participates in the exchange by establishing an account with authorized intermediary 510 and arranging to cover the cost of buying any futures contracts being bid on. Here, not only does buyer 522, seller 520 and service provider 530 telecommunicate their respective bid and ask prices to respective authorized intermediaries, but authorized intermediary 510 and authorized intermediary 512 exchange bids electronically also, rather than using an open outcry order matching system.

Every twenty-four hours, at a predetermined time, CH 506 reconciles the day's trading. The function of CH 506 is identical to that of clearinghouse 106 depicted in FIG. 1 for supporting a physical commodities exchange, that is to balance the books between the authorized intermediaries and transfer the necessary funds to cover the previous day's trading. CH 506 in the preferred embodiment of the present invention is a wholly owned subsidiary of the SerFEx, however outside financial institutions might be contracted to provide these services to the SerFEx 502. CH 506 is the buyer to all sellers and the seller to all buyers. At least once in every twenty-four hours the futures market is cleared and all accounts reconciled. CH 506 has full knowledge of the identities of all of the participants on both sides of all transactions of course, and will be tasked with the fundamental performance and consideration aspects of every contract trade. CH 506 also establishes opening and settlement prices for each contract for each trading session and will provide binding arbitration services for exchange transaction disputes between members.

Offsetting futures positions are reconciled by CH 506 at the mark to market each day. CH 506 also issues margin calls and has the power to enforce collection when needed. All cash market transactions are immediately cleared by CH 506. All cleared transactions, whether they be cash or open futures positions, have their respective title information passed by CH 506 to Title Management System 508.

A feature that distinguishes SerFEx CH 506 from the prior art is the inclusion of a royalty escrow mechanism, which will be discussed in more detail with respect to FIGS. 9A and 9B below. This mechanism is designed to protect the property rights of service suppliers such as artistic and sporting entertainment providers. Many such services have revenue sharing terms in their present-day forward or cash contracts to ensure that proceeds are distributed to the parties of the contract at the time of sale. Contracts traded on SerFEx 502 have the shared revenues placed in an escrow. The methods of the sharing are normally left to the terms of the individual contracts. When the contract transfers to the cash market the escrowed funds are distributed in accordance with the terms of the contract. The royalty escrow function allows a secondary market to operate for services that are subject to anti-scalping laws as the property rights of the entities that these laws are designed to protect, would be preserved by SerFEx CH 506.

A preferred embodiment of CH 506 also includes provisions for foreign exchange transactions. Contracts are denominated in the country of initiation of the service delivery. If a service contract's delivery is simultaneously carried out in two or more countries that have different currencies, the contract will be denominated in U.S. dollars unless the contract terms explicitly identifies a preferred currency.

Returning to FIG. 5, once a services futures contract has been settled, CH 506 indicates to title management system (TMS) 508 that a settlement of contract has occurred and it is necessary to change ownership records to reflect the sale. Remembering, TMS 508 originally received title for the physical commodities under contract from service provider 530. After the title for service has been verified, TMS 508 tracks its rightful owners by updating the ownership recorders each day the title is traded in the futures market. After recordation is completed, TMS 508 transfers the name of the new owner to CH 506 in anticipation of the next day's trading.

TMS 508 contains the hardware and software necessary to maintain the uninterrupted owner of record title information for every service contract. If a contract is removed from the exchange by issuing a certificate of title, TMS 508 retains a record of title until some date after delivery of service that the exchange rules or government regulations require. While it is possible for buyer 522 to take possession of a certificate of title from TMS 508 during futures trading, generally title is not transferred to seller 520 in the futures market, but is transferred later, in the cash market. All contracts entering and leaving the exchange have TMS records. If a contract re-enters the exchange before the delivery of service, TMS 508 includes a mechanism for processing the incoming certificate. Recordation and title to virtually all contracts are maintained as electronic media throughout their lifetime on the exchange. As discussed above, the cash market differs from the futures market in that a services futures contract bought in the cash market is immediately reconciled by CH 506 rather than at mark to market. Subsequent title recordation by TMS 508 is immediately performed and recordation of title is immediately transmitted back to CH 506 thereafter.

A record of the last titleholder is transferred to delivery point 540 and/or service provider 530 who performs the service as required by the contract at delivery point 540. Delivery of the service requires a person owning title to the service to present themselves to the service provider in accordance with the terms of the contract. Usually this requires that the last owner of record in TMS 508 to present identification documents that are acceptable to service provider 530 at delivery point 540 specified in the terms of the contract. If the contract has been removed from the exchange prior to delivery by the issuance of a title certificate, it will be the responsibility of service provider 530 and the claimant (buyer 522) to trace the title chain back to the TMS record. Various mechanisms exist for tracing, including, an endorsement sequence on the certificate itself, in a manner similar to that used by the banking industry for common checks.

In accordance with a preferred embodiment of the present invention, SerFEx 502 is organized as a for-profit enterprise. One advantageous organizational entity is that of a corporation with a board of directors representing the interest of the shareholders. A management team is engaged as agents for the owners to operate the enterprise. It competes with other financial concerns such as futures and equities exchanges, both organized and over the counter markets, for participation of suppliers, consumers, and speculators (the source of most of the liquidity that is available especially in futures markets). Like the prior art physical commodities exchanges, SerFEx 502 is subject to regulation by the Commodities Futures Trading Commission and in the case of activities associated with options trading, would also be subject to Securities and Exchange Commission oversight. The primary source of revenue for the exchange will be the collection of fair-market fees for the services of the exchange. The exchange will not assume title to any contracts that are traded on the exchange except as provided in CH procedures for market clearing and arbitration purposes. The exchange will be economically motivated to provide the lowest transaction costs possible, as doing so will increase the volume of trading activity, which in turn will increase the revenue earned by the exchange.

FIG. 6 is a flowchart depicting a method for processing services contract futures in accordance with a preferred embodiment of the present invention. The process is initiated by the receipt of an order from an authorized intermediary (step 602). Prior to executing the order, certain parameters must be understood, such as, the terms of the service contract, price, the customer's identity, and the order type (order types include, but are not limited to, market, limit, contingent, contingency, stop, market-if-touched (MIT), alternative, and scale) (step 604). Next, the order database is searched for a match based on the contract type, price, and the type of order (step 606). A check is made as to whether any contracts in the database match the present order (step 608). If no matches are present a decision as to whether or not to continue the order is made (step 610). If the decision is made to discontinue the order, the process immediately ends. On the other hand, if a decision is made to continue the order, the process again flows to step 606 where the database is again searched. The process continues to loop around until a match is detected within the database at step 608.

The match is processed differently in futures or a cash market, so a determination is made as to which market controls (step 612). A process for determining if the order should be properly processed in a futures or cash market is described below with respect to Figure 10. If the order is to be processed in a futures market, a recursive determination is made as to whether it is the mark to market time (step 614). If not the process recursively returns to step 614 until mark to market time. At that time the contract is settled in the clearinghouse by transferring funds from the buyer's account to the seller's account (step 616). Remember, from the perspective of the SerFEx, buyers and sellers are the authorized intermediaries, not the actual buyer and seller of the contract.

Returning to step 612, if a determination is made that the proper market for completing the trade is a cash market the process bypasses step 614 for checking mark to market time because the order is to be cleared immediately, rather than at mark to market time. Therefore, the contract is immediately settled in the clearinghouse by transferring funds from the buyer's account to the seller's account (step 616). The process is identical for futures and cash market from this point forward. The buyer is then recorded as the new owner by the TMS (step 618).

Processing is essentially complete; however, accommodations for redeeming the service must be instituted. As discussed above, the service provider must accept a properly endorsed transferable certificate of title if one is issued, otherwise, the service provider must perform for the last identifiable person on the record of title maintained by the TMS. A determination is made as to whether a certificate of title has been issued to the buyer by the TMS (step 620). If so, the identity of the titleholder is conveyed to the service provider (step 624). A certificate of title may be a transferable instrument; therefore, the service provider is obligated to provide service to the bearer of the certificate. However, the bearer may be required to show a legitimate chain of ownership to the last record of title. The process then ends.

Returning to step 620, if no certificate is delivered, a determination is made as to whether the buyer is the last titleholder of record (step 622). The last record of title may simply be the person on the record at a specific time prior to delivery time. If the buyer is not the last record of title the contract may be immediately returned to the database for storage or instead may merely exist in the TMS until the present buyer intends to sell the contract, at which time the contract will be returned to the database and the process continues from step 606. If, on the other hand, the sale makes the buyer the record of last title the TMS reports the identity of the last titleholder to the service provider (step 626) and the process ends.

FIG. 7 is a flowchart depicting a method for buying a service futures contract in the SerFEx in accordance with a preferred embodiment of the present invention. The flowchart depicted in FIG. 7 is taken from the perspective of a prospective buyer. The process begins with the prospective buyer identifying the needed service, performance date and time, delivery point, and the optimum price to bid on the service (step 702). Funds are then transferred to the potential buyer's authorized intermediary to cover the trade (step 704). It is, of course, envisioned that the buyer and the buyer's authorized intermediary have an ongoing relationship allowing the buyer to make the trade on credit, margin, or settle the account at some predetermined point in the future. Next, a buyer's order for a service futures contract is placed with the buyer's authorized intermediary (step 706).

A check is made as to whether any contracts in the database match the buy order (step 708). If no matches are present, a decision as to whether or not to continue the order at the present price is made (step 710). If a decision is made to adjust the price, the order with the new price is submitted to the authorized intermediary and the process reverts to step 706 where the database is again checked. The process iterates between steps 706-710 until either the order is matched or a decision is made to adjust the bid price, unless it is decided not to adjust the price at step 710. If, at step 710, a decision is made to not adjust the bid price, a determination is made whether or not to adjust the order (step 712). The prospective buyer might change any of the contract parameters in order to increase the chances of a match. For instance, change the quantity, quality, date, and time, or delivery point to better position the order for a match. The new order is then resubmitted to the authorized intermediary (step 706) where the database is again checked. Once again the process iterates between steps 706-710 for adjusting the bid price and now also iterates between 706 and 712 for adjusting the order. Assuming a decision is made not to either adjust the bid price or the order, a determination whether or not to continue the order is made (step 714). If a decision is made to continue the order, the process returns to step 708 and the database is again checked for a price match. The process then iterates between steps 706-710 for adjusting the bid price, or between steps 706-712 for adjusting the order, or between steps 708-714 for continuing the order. If, at step 714, it is decided to discontinue the order the process ends.

Returning to step 708, if and when a match between the bid price and the ask price occurs, a determination is made as to which market controls (step 716). Normally, the buyer does not participate in the determination for processing the buy order as either a futures contract or a cash contract, however, the buyer should be aware that confirmation from the authorized intermediary depends on whether the buy order is processed in the cash or futures market. If the order is to be processed in a futures market, a recursive determination is made as to whether it is the mark to market time (step 718). If not, the process recursively returns to step 718 until mark to market time. At that time the contract is settled in the clearinghouse by transferring funds from the buyer's account to the seller's account. The buyer is then notified by the buyer's authorized intermediary of the settlement and the transfer of funds (step 720).

Returning to step 716, if a determination is made that the proper market for completing the trade is a cash market, the order is cleared immediately. The contract is then immediately settled in the clearinghouse and funds are transferred to cover the cost of the sale. The buyer is then notified by the buyer's authorized intermediary about the settlement and the transfer of funds for the sale occurs (step 720).

Finally, the buyer may, at any time after the sale, request that the TMS delivers a certificate of title, so a determination is made by the buyer whether to request the certificate from the TMS (step 722). If the buyer does not request a certificate of title the process ends, however, if the buyer requests a certificate of title, the buyer will receive one from the TMS (step 724) and the process ends. Importantly, the certificate of title may be a transferable instrument, therefore, if the buyer requests a certificate of title and that certificate is subsequently lost or stolen, the buyer may be without a remedy for recovery of the service.

FIG. 8 is a flowchart depicting a method for selling a service futures contracts in the SerFEx in accordance with a preferred embodiment of the present invention. The flowchart depicted in FIG. 8 is taken from the perspective of a service provider but is similar in most respects to that of a prospective seller. The process begins with the service provider identifying the service, grade, performance date and time, delivery point, and the optimum price to ask for the service (step 802). The service provider must then contract to provide the specified service at the date, time, and delivery point at the ask price (step 804). If a seller is initiating the order then the contract terms will have already been defined and the only parameter left to be determined will be price so step 802 and 804 will be replaced by identifying an asking price for the service futures contract. Next, an order is placed with an authorized intermediary including identifying the contract and ask price (step 806).

Next, a check is made as to whether any bids in the database match the ask price of the sell order (step 808). If no matches are present, a decision as to whether or not to continue the order at the present price is made (step 810). If a decision is made to adjust the price, then an order with a new ask price is submitted to the authorized intermediary and the process reverts to step 806. The process iterates between steps 806-810 either until the order is matched or a decision is made to again adjust the ask price, unless it is decided not to adjust the ask price at step 810. If, at step 810, a decision is made not adjust the ask price, a determination is made whether or not to continue the order (step 812). If a decision is made to continue the order, the process returns to step 808 and the database is again checked for a match between the current ask price and bid prices in the database. The process then iterates between steps 806-810 for adjusting the bid price, or between steps 808-812 for continuing the order. If, at step 812, it is decided to discontinue the order the process ends.

Returning to step 808, if and when a match occurs between the ask price and bid price, then a determination is made as to which market controls (step 814). As discussed above, the buyer and seller do not normally participate in the determination for processing the buy order as either a futures contract or a cash contract, however the seller should be aware that confirmation from the authorized intermediary depends on whether the sell order is processed in the cash or futures market. If the order is to be processed in a futures market, a recursive determination is made as to whether it is the mark to market time (step 816). If not, the process recursively returns to step 816 until mark to market time. At that time the contract is settled in the clearinghouse by transferring funds from the buyer's account to the seller's account. The seller is then notified by the seller's authorized intermediary of the settlement and the transfer of funds (step 818).

Returning to step 814, if a determination is made that the proper market for completing the trade is a cash market then the order is processed immediately. The contract is then immediately settled in the clearinghouse and finds are transferred to seller's authorized intermediary account. The seller is notified by the seller's authorized intermediary about the settlement and the transfer of funds (step 818).

Finally, the buyer of the service may, at any time after the sale, request that the TMS deliver a certificate of title. Whether or not the buyer requests a certificate does not matter to a typical seller who is not also the service provider. However, if the seller is also the service provider then the seller/service provider must have a mechanism to identify the rightful owner of the service contract. A service provider will provide a service to the bearer of a certificate of title, if issued, or to a claimant who is of record of last title with the TMS. Therefore, a determination must be made by the seller whether the buyer has requested the certificate from the TMS (step 820). If the buyer requests a certificate of title the service provider receives a confirmation from the TMS that a certificate was issued and possibly the identity of the issuer (step 822). The service provider must then perform the service at the specified date, time, and delivery point for any valid holder of the certificate of title (step 824). Alternatively, if at step 820 a certificate is not issued, the service provider receives the identity of the last titleholder from the service contract record from the TMS (step 826). In that case, the service provider is obliged to perform the service at the specified date, time, and delivery point for only a properly identifiable last title holder (step 828). The process then ends.

Figure 9B:
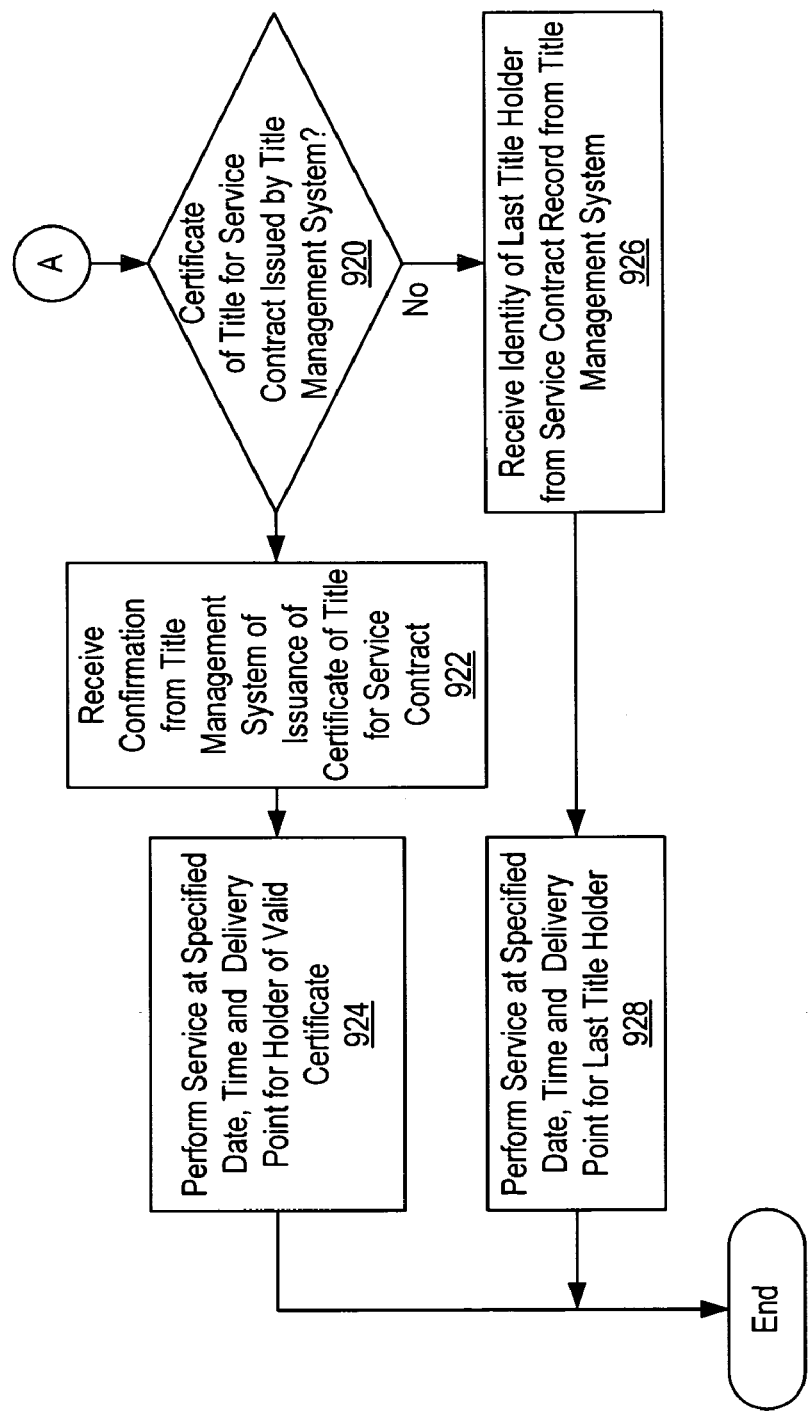

FIGS. 9A and 9B are flowcharts depicting a process for selling royalty escrow services contract futures in the SerFEx in accordance with a preferred embodiment of the present invention. The flowcharts depicted in FIG. 9A and 9B are taken from the perspective of a service provider but are similar in most respects to that of a prospective seller. Additionally, steps 902-928 are identical to steps 802-828 discussed with respect to FIG. 8 above, with minor exceptions, and therefore only the differences will be addressed below.

The primary distinction between service futures contracts and royalty escrow service contract futures is the distribution of the proceeds from the first and final sale of the services contract. Royalty escrow service contract futures are a special case of a service contract where the service provider who initiates the service contract may not be the sole provider of the service. One notable example is where a service provider is the venue where an artist is under contract with the service provider/venue to perform. There the service provider/venue will make its revenue on the sale of service futures contracts. The service provider/venue may either hedge or speculate on the service futures contracts in order to increase its revenue and shift the risk, as discussed in detail above. However, the artisan cannot participate in a price discovery process because the artisan's fees and royalty are usually contractually set. Therefore, if the right price for the service contract exceeds the price set in the contract with the service provider/venue, the artisan looses royalty while the service provider/venue can increase its share by participating in a price discovery process and speculating. The royalty escrow services contract futures mechanism is designed to protect the property rights of service providers such as artistic and sporting entertainment providers. Many contracts between service provider/venues and artisans have revenue sharing terms in their present-day forward or cash contracts to ensure that proceeds are distributed to the parties of the contract at the time of sale. Prior art commodity futures contracts have no such provision, so the artisan is unprotected when the right price for the service exceeds either the forward contract price or the cash contract price.

Turning to FIGS. 9A and 9B, the process for selling royalty escrow service contract futures is identical to the sale of basic service futures contracts until the seller receives cash for the transaction and confirmation of the sale from the authorized intermediary (step 918). In case of escrowed royalty service contract futures, the first seller and/or service provider will not receive the royalty. Royalty payments that result from the sale of service futures contracts are held in escrow until the artisan's service has been performed. The artisan's royalty is based on the final sale price of the service contract. Therefore, a determination is made as to whether the royalty escrow service contract futures is resold (step 930). If the contract future is not resold then the process proceeds to step 920 because the first sale is the final sale and the royalty has been computed and escrowed in step 918. At step 920 the process then proceeds with determining the rightful owner of the service contract.

Returning to step 930, TMS records show whether a service contract has been resold. If the service contract has been resold the royalty amount for the final selling price must be determined. First the final selling price is received from the TMS (step 932). Next, the additional royalty is calculated (step 934). The additional royalty is derived by:

Additional Royalty=[(Last Selling Price)−(Original Selling Price)]×[Royalty Rate]

Finally, the artisan's additional royalty is placed in escrow with the CH until the artist performs on the contract with the service provider. The process then proceeds to step 920 and determines the rightful owner of the service contract. In order to further safeguard the property rights of service providers entitled to royalties, the certificate of title, if issued, may be non-transferable.

Processing orders for service futures contracts is normally performed every twenty-four hours, at the mark to market time. At that time all outstanding contracts are settled and the futures market is cleared. Commodities contracts are usually transferred to the cash market the beginning of the trading day prior to the deliver date. In so doing, each commodity is trading in the cash market for approximately the same duration. Throughout the description of the present invention, the SerFEx must determine whether a services contract order is to be processed in the futures market or in the cash market. Unlike physical commodities futures, which usually ripen on a monthly basis, services contract may ripen at any time of the day or night. Ideally, switching a services contract from the futures market to the cash market should occur at the same relative time for each service with respect to that services performance time.

Therefore, rather than switching all ripe service contracts at the same time, without regard to the time of performance, every service contract will be switched N hours from its time to perform, or at its ripe time. Ripe service contracts are traded in the cash market. Thus, services contracts will move from the futures market to the cash market all hours of the day and night (remembering that trading takes place twenty-four hours a day and seven days a week in the SerFEx). By switching service contract from one market to the other every N hours, each service contract spends approximately the same number of hours being traded in the cash market.

As discussed above, one important aspect of the SerFEx is the ability of a potential buyer to bid on combinations of service contracts that equate to a needed service. In the prior art physical commodities futures exchanges, buyers have always had the ability to combine contracts of different quantities, grades, delivery dates, and delivery points in order to acquire enough product to meet the buyer's needs. However, changing contract parameters often represents a trade-off for the buyer that may lessen the potential profit derived from the commodity. Therefore, if the buyer needs a specific grade and quantity of a particular commodity at a certain destination, then the buyer is forced to match the bid price to the asking price in order to be assured of acquiring the needed commodity. Buyers of service contracts have alternative strategy, conjunctive orders.

A conjunctive order combines two or more dissimilar service contracts to form a needed service. Ideally, conjunctive orders do not sacrifice grade, quantity, performance date, or delivery point in order to acquire the necessary service. Individually, the service contracts that comprise a conjunctive order is of no real value to the buyer unless the buyer can secure each service contract, that as a whole, provide the buyer with the desired service. Therefore, an important tactic for acquiring each of the separate services in the conjunctive order is to make each service order contingent on acquiring the other services that comprise the conjunctive order. A contingent order ensures that the buyer will not succeed in buying only unusable services.

Figure 10:
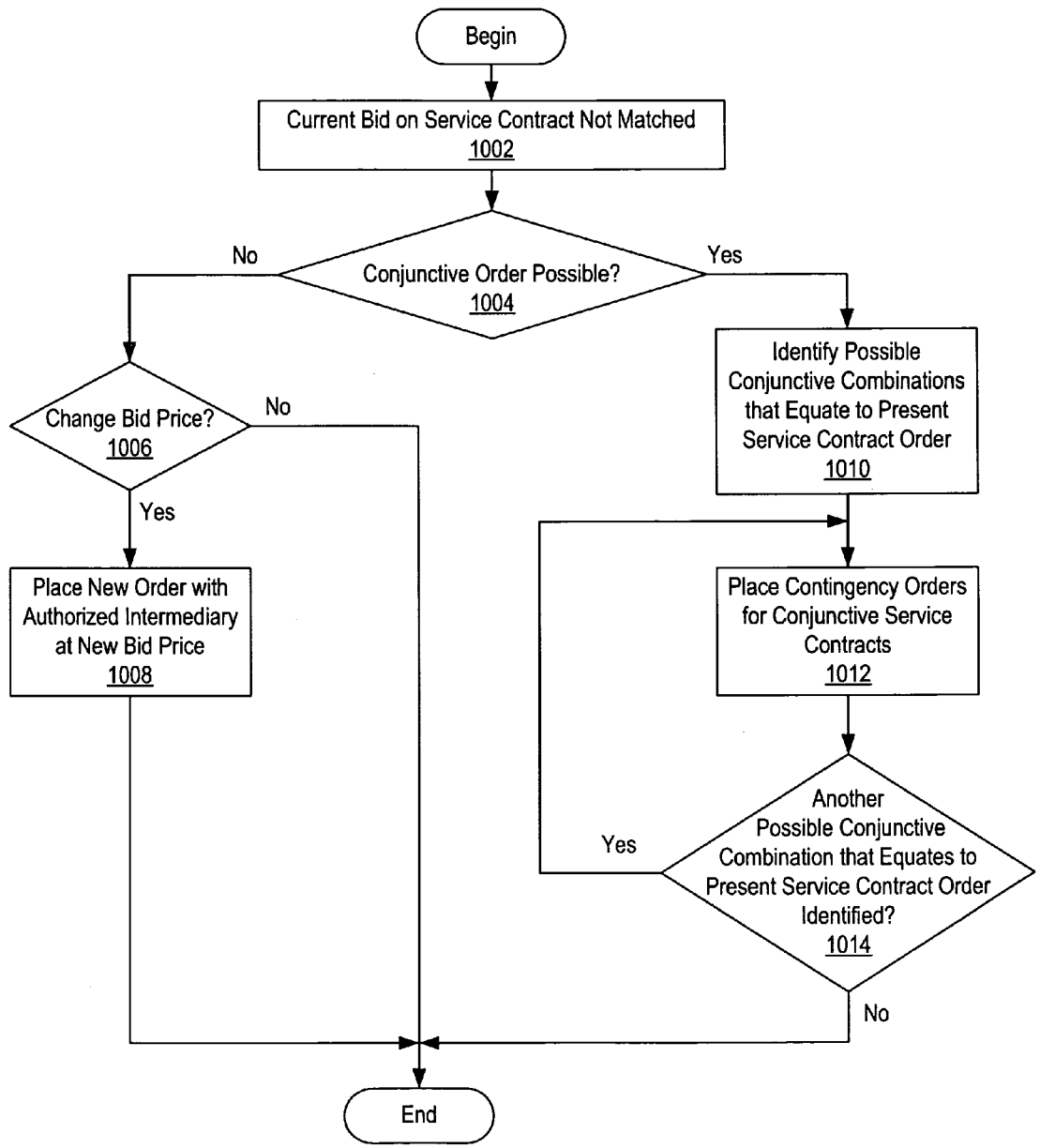
FIG. 10 is a flowchart depicting a process implementing a conjunctive service contract order strategy.

FIG. 10 is a flowchart depicting a process implementing a conjunctive service contract order strategy. Initially, it is assumed that a potential buyer has outstanding bids on a service contract that is not matched and the buyers must find an alternative to the contract (step 1002). The buyer must then determine if a conjunctive service contract order strategy is possible for the necessary service (step 1004). Certain services lend themselves to a conjunctive bidding strategy and others do not. Examples of those that do not include health care, social assistance, arts, entertainment, recreation, accommodation, and food service. Some services that easily adapt to a conjunctive bidding strategy are transportation, warehousing, postal services, financial and insurance; professional, scientific, and technical services. However, even if the service is particularly suited to conjunctive bidding, the individual services necessary to complete the conjunctive order might not be present in the market. If a conjunctive order in not possible, the buyer is left with the decision of whether or not to change the bid price (step 1006). Should the potential buyer not change the bid price the process ends, alternatively the potential buyer may reset the bid price with the authorized intermediary (step 1008). The process then ends.

Returning to step 1004, if a conjunctive order is possible, the potential buyer must then identify the best possible combinations of service orders that equate the present service contract order (step 1010). From the possible conjunctive combinations the potential buyer then places a contingency order for the conjunctive service contracts (step 1012). Clearly, the potential buyer would be worse off if some but not all of the individual orders were matched and bought while others were not. Therefore, the potential buyer should make every order in the conjunctive combination contingent on every other order in the combination.

It should be recognized that the conjunctive bidding strategy may be an alternative to successfully bidding on a service contract in the market. More than one possible conjunctive combination of service contracts may exist in the market that could supplement the primary conjunctive order (step 1014). If these services are in the market, the buyer may choose to bid on other conjunctive combination of services (step 1012). Importantly, a second conjunctive bid is seen as an alternative strategy to the primary conjunctive bid, so these bids should be contingent on each other's success as well as contingent on the failure of the primary conjunctive order. Acquiring two conjunctive service contract combinations is almost as bad as only acquiring some but not all of the individual orders in the conjunctive order. Other possible conjunctive orders may be identified and orders placed with the authorized intermediary to cover those combinations (steps 1012 to 1014). At some point, either no other conjunctive combination exists or the potential buyer decides not to place the order, the process then ends.

FIG. 11 is a flowchart depicting a process for determining whether a services contract should be traded in the futures market or the cash market. It is expected that this process may be performed by either the bid and ask order matching system (BAMS) or the clearinghouse (CH). The process described below is invoked only after a bid and ask price match has occurred. The process begins by getting the current date and time (step 1102). Next, the date and time for performance of the service contract is acquired, usually from the contract itself (step 1104). The time interval between the current date and time, and the performance date and time is then calculated and the time interval is compared to N (step 1106). Prior to making the comparison the time interval and N must be converted into the same unit of measure. N can be described in any unit, but hours is the most convenient. N can also have any value; however, it must be remembered that the purpose of the cash market is to immediately process ripe service contracts. Therefore, N equal to thirty-six hours is optimal.

Returning to step 1106, if the time interval is greater than N then the contract is processed under futures rules (step 1110) and the process ends. Alternatively, if the time interval is less than N, then the contract is too ripe to be processed in the futures market and is processed under cash rules instead (step 1108) and the process ends.

In accordance with a preferred embodiment of the present invention, service contracts traded on the SerFEx are not forward contracts but futures contracts. An important difference between forward and futures contracts is that usually the owner of a forward contact may not sell the acquired property right to the service. Normally, the service provider is obligated only to the original owner of the forward contract. The owner of a forward contract must exercise the right or it is lost. Conversely, the owner of a futures contract may sell the property right to another who may either sell it again or demand that the service provider perform the service contract. The time and place for the service provider to perform the contracted service is specified by the service contract itself. However, merely by being at the prescribed delivery point at the prerequisite time does not guarantee that the service provider will perform on the contract. While the service provider has made a contract to perform a service, the service provider must be protected from fraudulent attempts to gain service.

FIG. 12 is a flowchart depicting a process for a service provider performing on a service contract in accordance with a preferred embodiment of the present invention. The process begins with a demander making a claim for service at the specified date, time, and delivery point (step 1202). Next, the service provider must determine if the identity of the last titleholder of record has been provided by the TMS (step 1204). If the service provider has been provided with the identity of last title holder then a check is made between the identity of the demander and the identity of the last title holder of record (step 1206). If the demander is verified as the last titleholder of record the service provider must perform the contract service for the demander (step 1210). If, on the other hand, the identity of the demander cannot be verified as the last title holder of record, then the service provider must refuse service in lieu of providing the service for the proper demander (step 1208).

If the TMS has not provided the service provider with the identity of the last titleholder of record, then it is assumed that a certificate of title has been issued by the TMS. In practice, the TMS may notify the service provider of the issuance of a certificate of title and/or the identity of the last titleholder. In that case, the bearer of the certificate of title would be the legitimate owner of the service. There may also be situations, although rare, where a certificate of title was issued after the identity of the last titleholder was transmitted to the service provider. In any case, it should be appreciated that the bearer of the certificate of title is the proper owner of the service contract. Of course, in this example, the service provider may perform for the last titleholder of record only when presented with a demand for service from a claimant bearing certificate of title.

Returning to step 1204, if the identity of the last titleholder has not been transmitted, the demander is requested to present a certificate of title in order to demonstrate ownership of the service (step 1212). If the demander cannot produce the certificate, then the service provider must refuse service in lieu of providing the service for the proper demander (step 1208). Returning again the step 1212, if the demander does bear the certificate it must be authenticated (step 1214). Normally, authentication would require the bearer to show that the TMS issued a certificate to the bearer, or possibly prove a chain of ownership to the original recipient of the certificate from the TMS. It is understood that SerFEx rules ultimately define the steps necessary for a demander to authenticate a certificate of title. If the demander cannot authenticate the certificate to the satisfaction of the SerFEx, then the service provider must refuse service in lieu of providing the service for the proper demander (step 1208). If the demander presents an authentic certificate of title to the service provider, then the service provider is obliged to perform the contract service for the demander (step 1210). The process then ends.

As can be seen from the forgoing, the SerFEx is an electronic market system that enables the exchange of cash (spot and forward) contracts and futures contracts for the delivery of services. The exchange allows the futures market to determine the right price for services for the producers and consumers of those services, which is heretofore unknown in the art. Participants may buy, sell, or leverage services contracts through a variety of order types. Participants in the exchange may be producers of services, intermediaries, speculators, and consumers of the services. The exchange is a significant advancement over prior art exchanges by allowing the futures market to determine the right price for services for the producers and consumers of those services. The exchange is composed of a novel electronic infrastructure that has four major components: a front-end facility comprised of authorized intermediaries, an automated bid/ask matching system, a clearinghouse system, and a title management system. This infrastructure completely eliminates the needed for open outcry price matching. Because the exchange is not based on the open outcry method of price matching, the exchange operates twenty-four hours per day and seven days per week. As with a prior art exchange, all futures accounts are settled at least once in every twenty-four hours and the market is cleared. However, the owner of a service contract can take possession of a transferable title that can be redeemed for service contract performance with the service provider.

It is important to note that, while the present invention has been described in the context of a fully finctioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for implementing a service contract futures exchange, comprising:

receiving a bid order for a service futures contract, wherein the bid order originates from a bidder;

matching the bid order for a service futures contract with an ask order for a corresponding service futures contract in the data processing system, wherein an asker owns the corresponding service futures contract and the ask order originates from the asker; and transferring ownership of the corresponding service futures contract to the bidder.

2. The method recited in claim 1 above, prior to transferring ownership of the corresponding service futures contract to the bidder the method further comprises:

conveying funds from the bidder to the asker.

3. The method recited in claim 1 above, wherein matching the bid order for a service futures contract with an ask order for a corresponding service futures contract in the data processing system further comprises identifying service futures contract options for the service futures contract which is the subject of the bid order from the bidder.

4. The method recited in claim 1 above, wherein the bid order includes a bid price and further wherein the bid order identifies service futures contract options for the service order including at least one of service quantity, service grade, delivery date, and delivery point.

5. The method recited in claim 1 above, wherein receiving a bid order for a service futures contract further comprises obtaining the bid order from a bidder's authorized intermediary, wherein the bidder's authorized intermediary represents the bidder.

6. The method recited in claim 1 above, wherein the asker is represented by an asker's authorized intermediary.

7. The method recited in claim 1 above, wherein matching the bid order for a service futures contract with an ask order for a corresponding service futures contract in the data processing system further comprises:
   identifying service futures contract options for the service futures contract which is the subject of the bid order from the bidder in the data processing system, wherein the service futures contract options for the service order includes at least one of service quantity, service grade, service delivery date, and service delivery point;
   searching a plurality of available service futures contracts for at least one corresponding service futures contract in the data processing system, wherein the corresponding service contract includes service futures contract options that correspond to the service contract which is the subject of the bid from the bidder;
   identifying at least one corresponding service contract from the plurality of available service futures contracts in the data processing system;
   comparing a bid price associated with the bid order with each ask price associated with each ask order for the identified at least one corresponding service futures contract in the data processing system; and
   identifying at least one corresponding service futures contract having a price match in the data processing system, wherein the ask price of the ask order associated with the at least one corresponding service futures contract is lower than or equal to the bid price associated with the bid order.

8. The method recited in claim 2 above, wherein conveying funds from the bidder to the asker further comprises:
   receiving notification of a price match between a bid order from a bidder and an ask order from an asker;
   debiting a bidder's authorized intermediary; and
   crediting an asker's authorized intermediary.

9. The method recited in claim 8 above, wherein transferring ownership of the corresponding service futures contract to the bidder further comprises:
   receiving notification of funds being transferred from the bidder authorized intermediary to the seller's authorized intermediary for the corresponding service futures contract;
   accessing a title record for the corresponding service futures contract; and
   updating the title record for the corresponding service contract to reflect the bidder as the owner of the corresponding service futures contract.

10. The method recited in claim 1 above, further comprising:
    issuing a certificate of title to the bidder.

11. A data processing system implemented method for implementing a service contract futures exchange, comprising:
    receiving an ask order associated with an asker's service futures contract, wherein the ask order originates from an asker;
    entering the ask order in a service contract database containing a plurality of ask orders, each ask order being associated with a service futures contract;
    receiving a bid order for a bidder's service futures contract;
    searching the service futures contract database on the basis of the bid order;
    matching the bid order to the ask order in the data processing system; and
    recording an ownership change of the asker's service futures contract.

12. The method recited in claim 11 above, wherein the ask order identifies the asker's service futures contract by at least one of service quantity, service grade, service delivery date, and service delivery point and further wherein the bid order includes an ask price.

13. The method recited in claim 11 above, wherein receiving an ask order associated with an asker's service futures contract further comprises:
    receiving an asker's identity;
    receiving an ask price from the ask order;
    receiving a description of the asker's service futures contract including at least one of service quantity, service grade, service delivery date, and service delivery point; and
    receiving a title to the asker's service futures contract.

14. The method recited in claim 11 above, further comprises:
    transmitting an identity of a last owner of record to the asker.

15. The method recited in claim 11 above, wherein transferring ownership of the asker's service futures contract to the bidder further comprises:
    issuing a certificate of title to the bidder.

16. The method recited in claim 11 above, wherein receiving an ask order associated with an asker's service futures contract further comprises:
    receiving an asker's identity;
    receiving a royalty owner's identity;
    receiving an ask price from the ask order; and
    receiving a description of the asker's service futures contract including a royalty fee.

17. The method recited in claim 11 above, prior to recording the ownership change of the asker's service futures contract, method further comprises:
    conveying funds for the asker's service futures contract.

18. The method recited in claim 17 above, conveying funds for the asker's service futures contract further comprises:
    transferring funds from the bidder to the asker; and
    escrowing funds for a royalty owner based on a royalty fee.

19. The method recited in claim 11, further comprises:
    transmitting an identity of a last title holder of record to the asker.

20. The method recited in claim 11, further comprises:
    issuing a certificate of title to the bidder; and
    transmitting an identity of the bidder to the asker.

21. A data processing system implemented method for implementing a service contract futures exchange, comprising:
    receiving an ask order for an asker's service futures contract;
    receiving a bid order for a bidder's service futures contract;
    matching the bid order with the ask order in the data processing system;
    in response to matching the bid order with the ask order, determining whether to process the asker's service futures contract is in a cash market or a futures market in the data processing system; and processing the asker's service futures contract based on whether the asker's service futures contract is processed in a cash market or a futures market.

22. The method recited in claim 21, wherein the asker's service futures contract is a transferable contract to provide a service relating to at least one of construction; transportation and warehousing; postal services; information; real estate and rental and leasing; financial and insurance; professional, scientific, and technical services; management of companies and enterprises; administrative and support and waste management and remediation services; educational services; health care and social assistance; arts, entertainment, and recreation; accommodation and food services; public administration; and other services.

23. The method recited in claim 21, in response to the determination of whether to process the asker's service futures contract in a cash market, processing the asker's service futures contract further comprises:
transferring funds from the bidder to the asker; and
transferring ownership of the asker's service futures contract to the bidder following transferring funds from the bidder to the asker.

24. The method recited in claim 21, in response to the determination of whether to process the askers service futures contract in a futures market, processing the asker's service futures contract further comprises:
calculating mark to market time, wherein all futures service futures contracts are processed at mark to market time;
determining whether present time is equal to mark to market time;
on the basis of present time being equal to mark to market time, transferring funds from the bidder to the asker; and
transferring ownership of the asker's service futures contract to the bidder in response to transferring funds from the bidder to the asker.

25. The method recited in claim 21, wherein determining whether to process the asker's service futures contract is in a cash market or a futures market further comprises:
getting a ripe time value for the asker's service futures contract, wherein the ripe time value is an amount of time prior to service delivery time and date that the asker's service futures contract must be processed in a cash market;
determining a performance time value, wherein the performance time value is the amount of time from the present time until the service delivery time and date of the asker's service futures contract;
comparing the performance time value with the ripe time value for the asker's contract, wherein the asker's service futures contract is processed in a futures market only if the performance time value is greater than the ripe time value, otherwise the asker's contract is processed in a cash market.

26. A data processing system implemented method for implementing a service futures contract futures exchange, comprising:
receiving an ask order from an asker for an asker's service futures contract;
receiving a bid order from a bidder for a bidder's contract;
matching the bid order with the ask order in the data processing system;
transferring funds from the bidder to the asker in response to matching the bid order with the ask order; and transferring ownership of the asker's service futures contract to the bidder in response to transferring funds from the bidder to the asker.

27. The method recited in claim 26 above, wherein the bidder is the first bidder, the bid order is the first bid order, the ask order is the first ask order, the bidder's contract is a first bidder's contract and the method further comprises:
receiving a second ask order from the bidder for the asker's service futures contract;
receiving a second bid order from a second bidder for a second bidder's contract;
matching the second bid order with the second ask order;
transferring funds from the second bidder to the first bidder in response to matching the second bid order with the second ask order; and
transferring ownership of the asker's service futures contract to the second bidder in response to transferring funds from the second bidder to the bidder.

28. The method recited in claim 26 above, wherein receiving an ask order and receiving a bid order further comprise electronically telecommunicating the respective bid and ask orders.

29. The method recited in claim 26 above, wherein receiving an ask order and receiving a bid order further comprise orally communicating the respective bid and ask orders.

30. The method recited in claim 26 above, wherein matching the bid order with the ask order is performed orally using open outcry oral bargaining.

31. The method recited in claim 26 above, wherein matching the bid order to the ask order is performed electronically.

32. The method recited in claim 26 above, wherein receiving an ask order from an asker is performed electronically by an asker's authorized intermediary and further wherein matching the bid order with the ask order is performed orally using open outcry oral bargaining.

33. A data processing system implemented method for implementing a service futures contract futures exchange, comprising:
transmitting an ask order for an asker's service futures contract from the data processing system, wherein the ask order identifies an asker's service futures contract by at least one of service quantity, service grade, service delivery date, and service delivery point and further wherein the ask order includes an ask price;
receiving an indication, in the data processing system, that a bid price associated with a bid order from a bidder has matched the ask price; and
receiving sales funds for ownership of the asker's service futures contract, wherein the sales funds are equal in amount to the ask price.

34. The method recited in claim 33 above, wherein the asker's service futures contract is a transferable instrument promising to provide a service at a future service delivery date and remote service delivery point.

35. The method recited in claim 33 above, further comprising:
escrowing royalty funds for a royalty owner, wherein the royalty funds are equal in amount to a royalty fee.

36. The method recited in claim 34 above, further comprising:
receiving information as to an identity of the bidder;
receiving a demand for service from a demander;
identifying the demander;
confirming that the demander's identity matches the identity of the bidder; and
performing a service for the demander.

37. The method recited in claim 34 above, further comprising:
  receiving notification of an issuance of an asker's service futures contract certificate of title, wherein the asker's service futures contract certificate of title is one of a transferable instrument and a nontransferable instrument;
  receiving a demand for service from qa demander, wherein the demander bears a certificate of title;
  authenticating the certificate of title as the asker's service futures contract certificate of title; and
  performing a service for the demander.

38. The method recited in claim 34 above, further comprising:
  generating a second bid order for seller's service futures contract owned by the bidder in the data processing system, wherein the second bid order includes a second bid price;
  receiving a notification, in the data processing system, that the second bid order matched an ask order for the asker's service futures contract; and
  making available second sales funds for ownership of the asker's service futures contract, wherein the second sales funds are equal in amount to a second ask price.

39. A data processing system implemented method for implementing a service futures contract futures exchange, comprising:
  contracting for a secondary service from a secondary service provider;
  generating an ask order in the data processing system, wherein the ask order is for an askers service futures contract and further wherein the ask order identifies an asker's service futures contract by at least one of service quantity, service grade, service delivery date, and service delivery point and the ask order includes an ask price and a royalty fee amount;
  receiving an indication that a bid price associated with a bid order from a bidder has matched the ask price; and
  receiving sales funds for ownership of the asker's service futures contract, wherein the sales funds are equal in amount to the ask price less the royalty fee.

40. A data processing system implemented method for implementing a service futures contract futures exchange, comprising:
  transmitting a bid order for a bidder's service futures contract to the data processing system, wherein the bid order identifies a bidder's service futures contract by at least one of service quantity, service grade, service delivery date, and service delivery point and further wherein the bid order includes a bid price;
  receiving an indication from the data processing system that an ask price associated with an ask order for an asker's service futures contract from an asker has matched the bid price; and
  transferring funds for ownership of the asker's service futures contract, wherein the funds are equal in amount to the bid price.

41. The method recited in claim 40 above, further comprising:
  receiving an indication of ownership of the asker's service futures contract.

42. The method recited in claim 40 above, further comprising:
  receiving a certificate of title for the asker's service futures contract, wherein the asker's service futures contract certificate of title is one of a transferable instrument entitling a bearer of the certificate of title to the asker's service upon demand.

43. A data processing system implemented method for implementing a service futures contract futures exchange, comprising:
  transmitting a conjunctive bid order to the data processing system, wherein the conjunctive bid order identifies at least two dissimilar service futures contracts to form the conjunctive service and further each service futures contract identifies at least one of service quantity, service grade, service delivery date, and service delivery point and further wherein the conjunctive bid order includes a conjunctive bid price comprising a separate bid price for each service futures contract;
  receiving an indication from the data processing system that a first ask price associated with a first ask order for a first seller's service futures contract from a first seller has matched one bid price from the conjunctive order in the data processing system;
  receiving an indication from the data processing system that a last ask price associated with a last ask order for a last seller's service futures contract from a last seller has matched a last bid price from the conjunctive order, thereby completely matching the conjunctive bid order; and
  transferring funds for ownership of the first seller's service futures contract and the last seller's service futures contract, wherein the funds are equal in amount to the conjunctive bid price.

44. A data processing system implemented method for implementing a service contract futures exchange, comprising:
  receiving at least one bid order and at least one ask order for a service futures contract, wherein the service futures contract is a transferable contract to provide a service relating to at least one of construction; transportation and warehousing; postal services; information; real estate and rental and leasing; financial and insurance; professional, scientific, and technical services; management of companies and enterprises; administrative and support and waste management and remediation services; educational services; health care and social assistance; arts, entertainment, and recreation; accommodation and food services; public administration; and other services;
  matching the at least one bid order to the at least one ask order for a service futures contract in the data processing system, wherein a basis for matching is price of the service futures contract.

45. A data processing system implemented system for implementing a service contract futures exchange, comprising:
  transmitting means for transmitting a bid order for a bidder's service futures contract, wherein the bid order identifies a bidder's service futures contract by at least one of service quantity, service grade, service delivery date, and service delivery point and further wherein the bid order includes a bid price;
  receiving means for receiving an indication that an ask price associated with an ask order for an asker's service futures contract from an asker has matched the bid price; and
  transferring means for transferring funds for ownership of the asker's service futures contract, wherein the funds are equal in amount to the bid price.

46. The system recited in claim 45 above, further comprising:
receiving means for receiving an indication of ownership of the asker's service futures contract.

47. The system recited in claim 45 above, further comprising:
receiving means for receiving a certificate of title for the asker's service futures contract, wherein the asker's service futures contract certificate of title is one of a transferable instrument entitling a bearer of the certificate of title to the asker's service upon demand.

48. A data processing system implemented method for implementing a service contract futures exchange, comprising:
receiving an ask order for a service futures contract, wherein the ask order originates from a speculator, said speculator not having an ownership interest in said service futures contract;
receiving a bid order for a service futures contract, wherein the bid order originates from a bidder;
matching the bid order with the ask order in the data processing system; and
reconciling offsetting futures positions for the bid order and the ask order.

49. The method recited in claim 48 above, wherein reconciling offsetting futures positions of the bid order and the ask order comprises:
recognizing the ask order as a short sale for a service futures contract; and
issuing a call against said speculator for an amount equaling a price for said service futures contract.

50. The method recited in claim 48 above, wherein the bid order is a first bid order and the ask order is a first ask order and prior to reconciling offsetting futures positions the method comprises:
receiving a second bid order for a service futures contract, wherein the second bid order originates from the speculator;
matching the second bid order with a second ask order, said second ask order originates from a participant having an ownership interest in said service futures contract; and
wherein reconciling offsetting futures positions further comprises:
transferring ownership of the service futures contract from the participant to the bidder, via the speculator's bid and ask orders.

51. A data processing system implemented method for implementing a transportation service futures contract futures exchange for a transportation market, comprising:
receiving a plurality of ask orders for service futures contracts, wherein the plurality of ask orders originate from speculators, said speculators not having an ownership interest in said service futures contracts;
receiving one ask order for service futures contract, wherein the one ask order originates from a service producer, said service producer having an ownership interest in one service futures contract;
receiving a plurality of bid orders for service futures contracts, wherein the bid orders originates from a plurality of bidders;
matching the plurality of bid orders with both the plurality of ask orders and the one ask order in the data processing system; and
reconciling offsetting futures positions for the plurality of bid orders and with both the plurality of ask orders and the one ask order.

52. A data processing system implemented method for implementing a transportation service futures contract futures exchange for a transportation market, comprising:
receiving an ask order for a service futures contract, wherein the ask order originates from an asker;
receiving a bid order for a service futures contract, wherein the bid order originates from a bidder;
matching the bid order with the ask order in the data processing system;
holding the matching bid and ask orders;
ascertaining an occurrence of time to mark to market; and
reconciling offsetting futures positions for the bid order and the ask order in response to the occurrence of time to mark to market.

53. A data processing system implemented method for implementing a transportation service futures contract futures exchange for a transportation market, comprising:
receiving an ask order for a service futures contract from an asker, said ask order defining first service futures contract options for the service futures contract;
analyzing said ask order for said first service futures contract options including at least an execution date and an ask price, said ask price being based both the execution date and the service having no residual value subsequent to the execution date;
receiving a bid order for a service futures contract from a bidder, said bid order defining second service futures contract options for a service futures contract;
analyzing said bid order for said second service futures contract options including at least an execution date and a bid price, said bid price being based both the execution date the service having no residual value subsequent to the execution date;
matching the bid price of the bid order with the ask price of the ask order in the data processing system; and
setting the value for the service based on the matching bid price for the contract.

54. A data processing system implemented method for implementing a transportation service futures contract futures exchange for a transportation market, comprising:
receiving an ask order for a service futures contract, wherein the ask order originates from an asker;
receiving a bid order for a service futures contract, wherein the bid order originates from a bidder;
matching the bid order with the ask order in the data processing system; and
reconciling offsetting futures positions for the bid order and the ask order.

55. A data processing system implemented method for implementing a transportation service futures contract futures exchange for a transportation market, comprising:
receiving an ask order for a service futures contract from an asker, said ask order defining first service futures contract options for the service futures contract;
displaying said first service futures contract options to participants to the transportation service futures contract futures exchange, said first service futures contract options including at least an ask price;
receiving a first bid order for the service futures contract from a first bidder, said bid order defining second service futures contract options for a service futures contract;
displaying said second service futures contract options to the participants of the transportation service futures contract futures exchange, said second service futures contract options including at least a first bid price;

receiving a second bid order for the service futures contract from a second bidder, said second bid order defining second service futures contract options including a second bid price, said second bid price being based in the first bid price displayed by the transportation service futures contract futures exchange;

matching the second bid price of the second bid order with the ask price of the ask order in the data processing system; and setting the value for the service based on the matching second bid price for the contract.

56. A data processing system implemented method for implementing a transportation service futures contract futures exchange for a transportation market, comprising:

receiving an ask order for a service futures contract from a service producer, said ask order defining first service futures contract options for the service futures contract including at least an ask price, a royalty owner's identity and a royalty rate;

receiving a bid order for the service futures contract from a bidder, said bid order defining second service futures contract options including a second bid price, said second bid price being based in the first bid price displayed by the transportation service futures contract futures exchange;

matching the bid price of the bid order with the ask price of the ask order in the data processing system;

reconciling offsetting futures positions for the bid order and the ask order comprising:

ascertaining a royalty owner's identity from the first service futures contract options;

ascertaining a royalty rate from the first service futures contract options;

calculating a royalty fee from the royalty rate;

dispersing the royalty fee to the royalty owner;

dispersing the bid price less the royalty fee to a asker of the ask order having a matching ask price; and transferring ownership of the service futures contract to a bidder of a bid order having the matching bid price.

57. The data processing system implemented method recited in claim 56, wherein the royalty owner is the service producer.

58. The data processing system implemented method recited in claim 56, wherein the royalty owner is a subsequent owner of the service futures contract.

59. The method recited in claim 1 above, wherein the bid order is the first bid order, the ask order is the first ask order and the service futures contract is a first service futures contract, the method further comprises:

receiving a first ask order for a first service futures contract from a first asker, said first ask order defining first service futures contract options for the service futures contract including at least a first ask price, first execution locations and a first execution time;

receiving a second ask order for a second service futures contract from a second asker, said second ask order defining second service futures contract options for the service futures contract including at least a second ask price, second execution locations and a second execution time, wherein at least a portion of the first execution locations are different from the second execution locations;

receiving a bid order for third service futures contract from a bidder, said bid order defining third service futures contract options for the third service contract including at least a bid price, third execution locations and an execution time interval;

matching the bid order to the first and second ask orders by forming conjunctive relationships between the first service futures contract options and the second service futures contract options, comprising identifying a sequential relationship in the first execution locations and the second execution locations, that matched the third execution locations;

identifying a sequential relationship in the first execution time and the second execution time, that matched the third execution time interval; and matching a sum of the first ask price and the second ask price match, to the bid price; and transferring ownership of first service futures contract and the second service futures contract based on options and the second service futures contract options.

60. A data processing system implemented method for implementing a service contract futures exchange, comprising:

receiving an order in the service contract futures exchange data processing system;

parsing the order into order process type, contract type field, contract price field, delivery time field, and bidder identification field;

identifying the order process type as a bid type process; and in response to identifying the order process type from the order, executing a bid process in the service contract futures exchange data processing system, comprising:

identifying the contract type as a futures contract for delivery of a particular type of service from the order;

accessing a database in the service contract futures exchange data processing system based on the contract type;

identifying a plurality of ask orders in the database;

searching the plurality of ask orders from the database;

returning at least one ask order for a futures contract for delivery of the particular type of service, based on the contract type field;

returning at least one ask order for a futures contract for delivery of the particular type of service at the delivery time;

matching the contract price from the bid order to a contract price for one of the returned at least one ask order in the service contract futures exchange data processing system;

determining an identity for a contract owner of the futures contract for delivery of the particular type of service at the delivery time;

transferring ownership of the futures contract for delivery of the particular type of service at the delivery time from the contract owner to the bidder identified in the bidder identification field of the order futures contract for delivery of the particular type of service at the delivery time;

recording the bidder identified in the bidder identification field of the order as the owner of the service contract futures exchange data processing system;

establishing a price for the particular type of service at the delivery time based on the contract price; and transmitting the established price for the particular type of service at the delivery time for displaying external to the service contract futures exchange data processing system.

61. The data processing system recited in claim 60 further comprising:

offsetting futures positions for the bidder and the contract owner.

62. A method recited in claim 1 further comprising:

identifying a service market to be represented in the service contract futures exchange, the service market comprising a plurality of service related assets provided by service providers;

receiving an ask order for a service futures contract in the service contract futures exchange data processing system for future delivery of an underlying service related asset identified in the service contract futures exchange data processing system and specifying a future delivery date for a service provider to delivery the underlying service related asset, the ask order originating from an asker and representing an open futures position obligating the asker to relinquish ownership of a related service futures contract based on an ask price;

receiving a bid order for a service futures contract in the service contract futures exchange data processing system for future delivery of an underlying service related asset identified in the service contract futures exchange data processing system, the bid order originating from a bidder and representing an open futures position in which the bidder is obliged to relinquish funds equivalent to a bid price for ownership of a service related futures contract;

displaying one of the bid price and the ask price for the related service futures contract for the matched orders, wherein the one of the bid price and the ask price establishes a price for the future delivery of the underlying service asset identified in the service contract futures exchange data processing system; and transferring ownership of a service futures contract to the bidder in response to matching the bid order with the ask order in the service contract futures exchange data processing system.

\* \* \* \* \*